(12) United States Patent
Kornaros et al.

(10) Patent No.: US 11,503,476 B1
(45) Date of Patent: Nov. 15, 2022

(54) AUTONOMOUS DEPLOYMENT OF STATIONARY TRANSCEIVER DEVICES

(71) Applicant: IOSEA Inc., Aliso Viejo, CA (US)

(72) Inventors: Evangelos Kornaros, Boulder, CO (US); Saman Kabiri, Aliso Viejo, CA (US)

(73) Assignee: IOSEA Inc., Aliso Viejo, CA (US)

( * ) Notice: Subject to any disclaimer, the term of this patent is extended or adjusted under 35 U.S.C. 154(b) by 0 days.

(21) Appl. No.: 17/370,842

(22) Filed: Jul. 8, 2021

(51) Int. Cl.
*H04W 16/18* (2009.01)
*H04B 17/309* (2015.01)

(52) U.S. Cl.
CPC .......... *H04W 16/18* (2013.01); *H04B 17/309* (2015.01)

(58) Field of Classification Search
None
See application file for complete search history.

(56) References Cited

U.S. PATENT DOCUMENTS

| | | | | |
|---|---|---|---|---|
| 5,949,988 A * | 9/1999 | Feisullin | ............ | H04B 17/0082 342/359 |
| 10,440,678 B2 * | 10/2019 | Hedley | ................. | G01S 5/0294 |
| 11,227,082 B2 * | 1/2022 | Yamauchi | ............. | H04W 16/18 |
| 11,363,557 B2 * | 6/2022 | Lev | ........................ | H04B 17/27 |
| 2008/0132170 A1 * | 6/2008 | Alizadeh-Shabdiz | ...................... | H04W 4/029 455/41.2 |
| 2015/0230100 A1 * | 8/2015 | Atia | ...................... | H04W 16/22 370/252 |
| 2015/0304886 A1 * | 10/2015 | Liu | ........................ | H04L 47/829 370/254 |
| 2018/0060476 A1 * | 3/2018 | Kasch | ..................... | G01D 15/06 |
| 2019/0204429 A1 * | 7/2019 | Booij | ...................... | G01S 11/14 |
| 2020/0221314 A1 * | 7/2020 | Cho | ....................... | H04W 28/02 |
| 2020/0304219 A1 * | 9/2020 | Park | ........................ | G06V 20/13 |
| 2021/0112422 A1 * | 4/2021 | Epstein | ............... | F21V 33/0052 |
| 2022/0232393 A1 * | 7/2022 | David | ................... | H04W 16/18 |

OTHER PUBLICATIONS

Kabiri, S. et al., "Tightly Coupled Arrays Design Based on Phase Center Contour for Indoor Direction Findings in Harsh Environments," IEEE Transactions on Antennas and Propagation, vol. 68, Iss. 4, Apr. 2020, pp. 2698-2713.
Kabiri, S., "Novel Methodologies to Mitigate Multipath for Indoor Localization," UC Irvine, Sep. 2019, pp. 1-155.
Kornaros, E. et al., "A Novel Model for Direction Finding and Phase Center with Practical Considerations," IEEE Transactions on Antennas and Propagation, vol. 65, Iss. 10, Oct. 2017, pp. 5475-5491.

* cited by examiner

Primary Examiner — Lonnie V Sweet
(74) Attorney, Agent, or Firm — Fenwick & West LLP

(57) ABSTRACT

A transceiver system includes one or more groups of transceivers. The locations of the transceivers are initially unknown. During deployment, the location of each transceiver in the group is automatically estimated by the remaining transceivers in the group. Once the locations of the transceivers in the group are estimated, deployment of the transceivers is complete. The transceivers may estimate location attributes of mobile transceivers within a vicinity of the transceivers in the group.

21 Claims, 26 Drawing Sheets

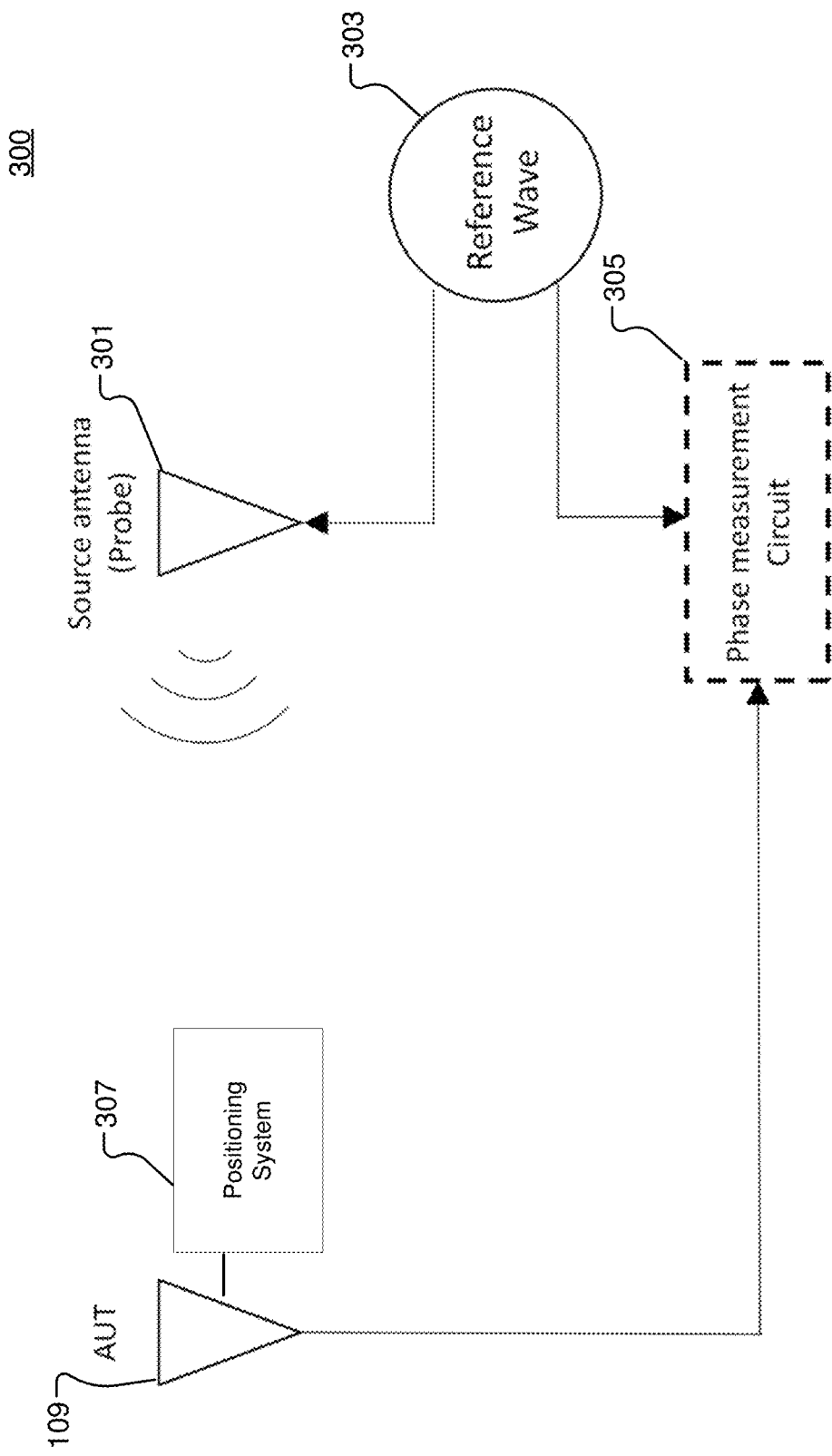

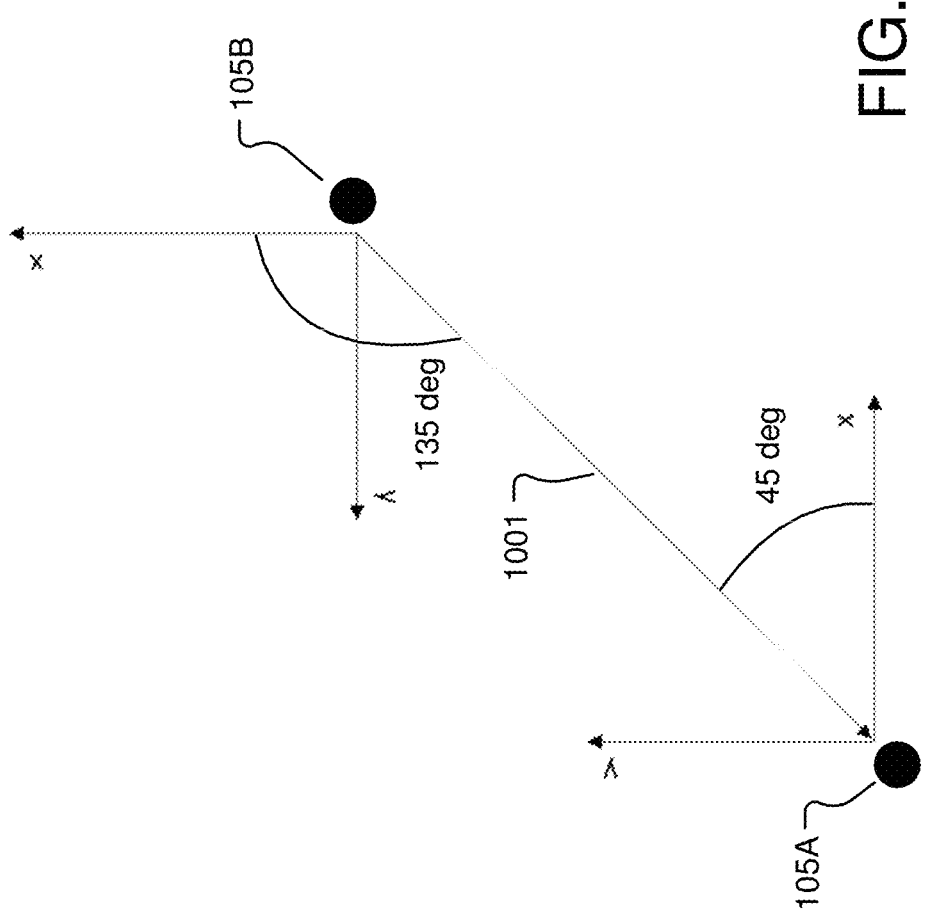

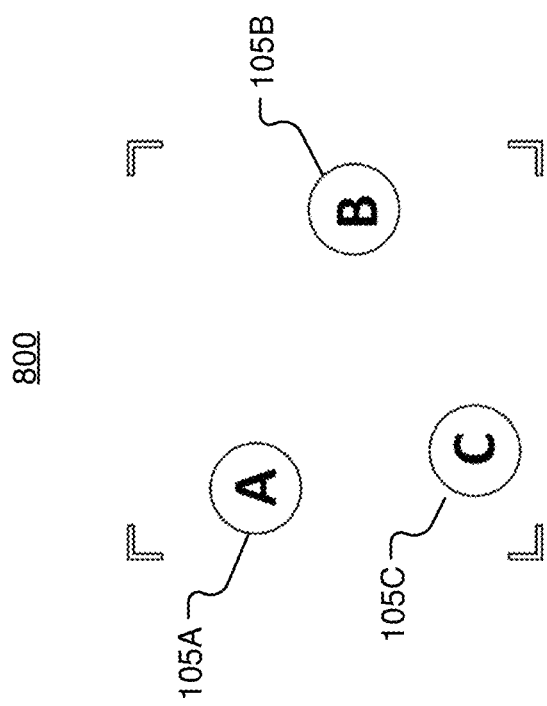

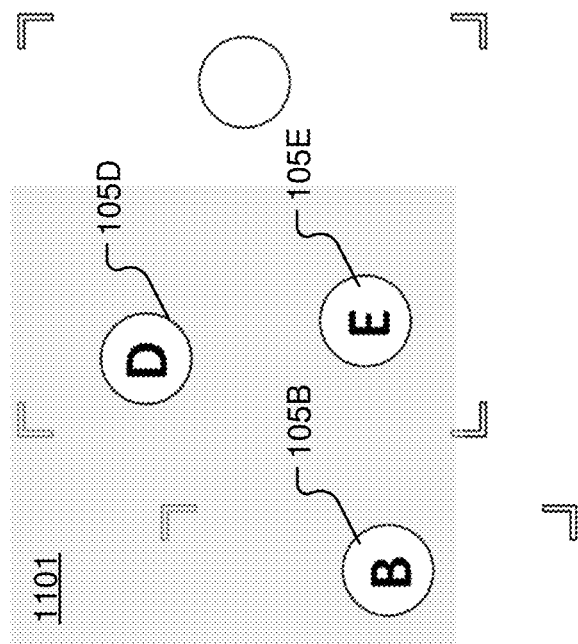
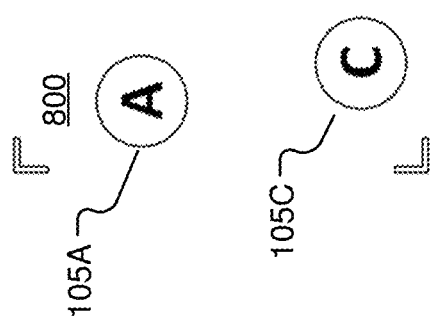
FIG. 11B

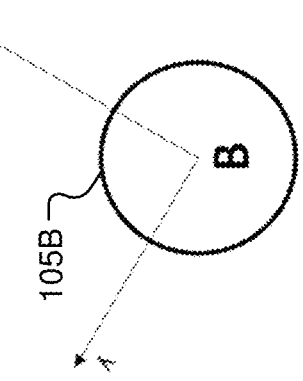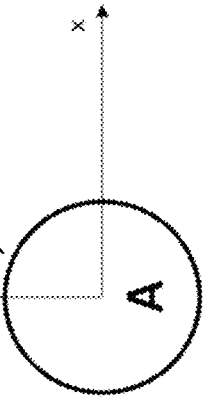
FIG. 12

AUTONOMOUS DEPLOYMENT OF STATIONARY TRANSCEIVER DEVICES

BACKGROUND

1. Field of Art

The disclosure generally relates to localization technology, and more specifically to autonomous deployment of stationary transceivers that are used to estimate location attributes of mobile transceivers.

2. Description of the Related Art

Localization technology allows for tracking of objects and locating objects. As a result, localization technology is used in a wide range of applications in various environmental settings. For example, localization technology may be used to track the location of objects in indoor environments or to identify directions within indoor environments. However, conventional localization technology requires manual setup of tracking devices in order for the tracking devices to locate other devices which is tedious.

Furthermore, conventional localization technology currently relies on Global Positioning System (GPS) signals for location tracking. However, GPS signals suffer from inaccuracy in indoor environments due to the obstacles in the indoor environments that contaminate the GPS signals thereby resulting in inaccurate location tracking.

SUMMARY

A transceiver system includes one or more groups of transceivers. In one embodiment, the transceivers included in the groups may be stationary in that the transceivers are positioned at a fixed location. The stationary transceivers estimate location attributes of one or more other transceivers that are mobile.

In order to estimate the location attributes of the one or more mobile transceivers, the stationary transceivers first need to be deployed (i.e., initialized). The locations of the stationary transceivers in the groups are initially unknown. During deployment, the location of each stationary transceiver in the group is automatically estimated by the remaining stationary transceivers in the group. Accuracy of the locations of the stationary transceivers is critical as any error in the locations of the stationary transceivers is reflected in the accuracy of the estimated locations of mobile transceivers after deployment of the stationary transceivers.

To estimate the locations of other stationary transceivers in the group, each stationary transceiver performs a selection process of radio frequency (RF) signals received from the remaining stationary transceivers in the group. The RF signals selected by each stationary transceiver are used by the stationary transceiver to estimate the locations of the remaining stationary transceivers that transmitted the selected RF signals.

In one embodiment, each stationary transceiver estimates the location of the remaining stationary transceivers in the group by correlating the selected RF signals to a device model of the stationary transceiver that received the RF signals. The device model of a stationary transceiver is representative of a path of a RF signal through the stationary transceiver.

The correlation of the selected RF signals to the device model results in an estimation of location attributes of the stationary transceiver that transmitted the selected RF signals. In one embodiment, the location attributes include an angle of arrival of the RF signals. The stationary transceiver may then estimate the location of the remaining stationary transceiver using the angle of arrival of the RF signals for example.

Once the locations of the stationary transceivers in the group are estimated, deployment of the stationary transceivers is complete. The stationary transceivers may estimate location attributes of mobile transceivers within a vicinity of the stationary transceivers in the group. Through the automatic deployment of the stationary transceivers in the group and usage of the device model to estimate location attributes of mobile transceivers, the embodiments herein have an improved accuracy over GPS based localization technologies.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes only, and may not have been selected to delineate or circumscribe the inventive subject matter.

BRIEF DESCRIPTION OF THE DRAWINGS

The disclosed embodiments have advantages and features that will be more readily apparent from the detailed description, the appended claims, and the accompanying figures (or drawings). A brief introduction of the figures is below.

FIGS. 3A to 3E illustrate a testing system for extracting different model parameters of a transceiver under test according to an embodiment.

FIG. 10 illustrates communication between stationary transceivers to calculate an orientation of the stationary transceivers according to one embodiment.

FIGS. 11A to 11C illustrate a creation of groups of stationary transceivers according to one embodiment.

FIG. 12 illustrates a system environment of deployed stationary transceivers with known locations and mobile transceivers with unknown locations according to one embodiment.

DETAILED DESCRIPTION

The Figures (FIGS.) and the following description relate to embodiments by way of illustration only. It should be noted that from the following discussion, alternative embodiments of the structures and methods disclosed herein will be readily recognized as viable alternatives that may be employed without departing from the principles of what is claimed. Reference will now be made in detail to several embodiments, examples of which are illustrated in the accompanying figures. It is noted that wherever practicable similar or like reference numbers may be used in the figures and may indicate similar or like functionality.

System Environment According to First Embodiment

Figure 1A:
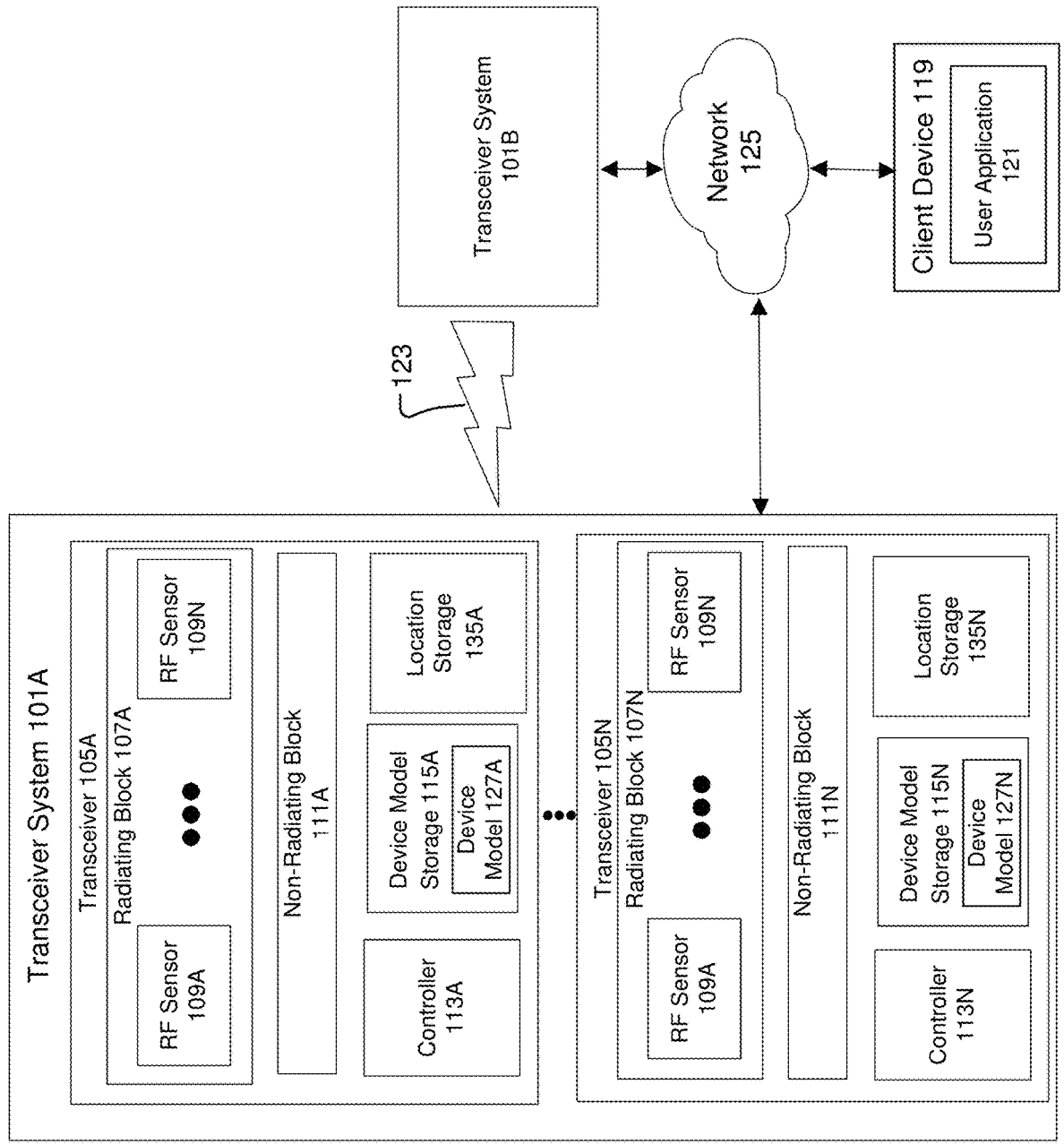
FIG. 1A illustrates a location tracking environment according to a first embodiment.

FIG. 1A is a location tracking environment 100A that includes a transceiver system 101A, a transceiver system 101B, and a client device 119 according to a first embodiment. The location tracking environment 100A may represent an indoor environment, an outdoor environment, or a mix of an indoor and outdoor environment. Each of transceiver system 101A and transceiver system 101B may be configured to operate in either a transmitting mode or a receiving mode. During the transmitting mode of a given transceiver system, the transceiver system is configured to operate as a transmitter and transmits a radio frequency RF signal (e.g., a wireless signal) to another transceiver system that is operating in the receiving mode. During the receiving mode of a given transceiver system, the transceiver system is configured to operate as a receiver and receives an incoming RF signal from another transceiver system that is operating in the transmitting model. Transceiver system 101A and transceiver system 101B may transmit and/or receive RF signals using a wireless communication protocol such as Bluetooth, Wi-Fi, Zigbee, Z-Wave, Long Range (LoRa), Thread, Narrowband-Internet of Things (Nb-IoT), radio-frequency identification (RFID), 3G/4G/5G technologies, Ultra-Wideband (UWB), any proprietary wireless technologies, or other commonly available wireless technology.

In the description herein, transceiver system 101A functions as a receiver since transceiver system 101A is in the receiving mode whereas transceiver system 101B functions as a transmitter since transceiver system 101B is in the transmitting mode and transmits a RF signal 123 to the transceiver system 101A. However, transceiver system 101A may function as a transmitter when configured in the transmitting mode and transceiver receiver 101B may function as a receiver when configured in the receiver mode.

Generally, the transceiver system 101A may estimate location attributes for the transceiver system 101B using one or more device models of the transceiver system 101A that are used to interpret the incoming RF signal from the transceiver system 101B. In one embodiment, the location attributes represent information that may be used to estimate the location of the transceiver system 101B. The estimated location attributes for the transceiver system 101B include the location of the transceiver system 101B with respect to a global coordinate system and an estimated angle (e.g., azimuthal φ, and elevation θ) of the transceiver system 101B in one embodiment.

The estimated location attributes may also include relative location attributes between the transceiver system 101A and the transceiver system 101B. Examples of the relative location attributes include an estimated distance between the transceiver system 101A and the transceiver system 10B, an estimated angle (e.g., azimuthal φ, and elevation θ) between the transceiver system 101A and the transceiver system 101B, and an estimated time of travel of the RF signal 123 between the transceiver system 101A and transceiver system 101B.

In one embodiment, a client device 119 is in communication with the transceiver system 101A and the transceiver system 101B via a network 125. The network 125 provides a communication infrastructure between the client device 119 and the transceiver systems 101A, 101B. The network 125 is typically the Internet, but may be any network, including but not limited to a Local Area Network (LAN), a Metropolitan Area Network (MAN), a Wide Area Network (WAN), a mobile wired or wireless network, a private network, or a virtual private network. As shown in FIG. 1A, the client device 119 includes a user application 121 in one embodiment. The user application 121 includes a user interface that displays the estimated location attributes of the transceiver system 101B to a user, for example. The user may be a person that is tracking the location of the transceiver system 101B, for example.

Transceiver Components According to First Embodiment

As shown in FIG. 1A, the transceiver system 101A includes one or more transceivers 105A to 105N where N is an integer greater than 0. Each transceiver 105A to 105N includes its respective radiating block 107, non-radiating block 111, controller 113, and device model storage 115. For example, transceiver 105A includes radiating block 107A, non-radiating block 111A, controller 113A, and device model storage 115A. Similarly, transceiver 105N includes radiating block 107N, non-radiating block 111N, controller 113N, and device model storage 115N. The description of the following components of the transceiver 105A are applicable to the components of transceiver 105N, and thus the description of the components of transceiver 105N are omitted for ease of description.

In one embodiment, the radiating block 107A is configured to radiate one or more RF signals of the transceiver 105A while the transceiver 105A is in the transmitting mode. In contrast, the radiating block 107A is configured to receive one or more incoming RF signals while the transceiver 105A is in the receiving mode. As shown in FIG. 1A, the radiating block 107A has one or more radiating components that radiate RF signals in the transmitting mode or receive incoming RF signals in the receiving mode. For example, the radiating components are RF sensors 109A to 109N that are each configured to output a RF signal while the transceiver 105A is in the transmitting mode or receive an incoming RF signal while the transceiver 105B is in the receiving mode. In one embodiment, each RF sensor 109A is an antenna and the RF sensors 109A to 109N are arranged in an antenna array.

In one embodiment, the non-radiating block 111A of the transceiver 105A includes non-radiating components of the transceiver 105A that are not configured to radiate a RF signal. The non-radiating components of the non-radiating block 111A include RF switches, ports, transmission lines, and RF components such as a balun, attenuator, RF hybrid couplers, or resistor-inductor-capacitor (RLC) components. Note that the non-radiating block 111A may have other non-radiating components than described herein.

The controller 113A is configured to generate a device model 127A of the transceiver 105A. Generally, the device model 127A is a representation of possible signal paths through the non-radiating components of the non-radiating block 111A, one or more ports of the non-radiating block 111A, one or more ports of the radiating block 107A that are connected to the one or more ports of the non-radiating block 111A, and the RF sensors 109A to 109N of the radiating block 107A. In one embodiment, the controller 113A correlates an incoming RF signal from the transceiver system 101B to estimate location attributes of the transceiver system 101B, as will be further described with respect to FIG. 2.

In one embodiment, the device model of transceiver 105A is a set or a matrix of data entries where each data entry in the matrix is associated with a particular RF path in the transceiver 105A using a particular RF sensor from RF sensors 109A to 109N. Each data entry in the data model describes the RF response of the associated RF path to an incoming RF signal at a given polarization $\theta$ and $\varphi$. The RF response is specified in terms of a magnitude of power and a phase of the power. The matrix includes for each RF path of the transceiver 105A entries for possible combinations of $\theta$ and $\varphi$ of the incoming signal RF used to illicit the RF response in order to model the possible RF responses for the RF path of the transceiver 105A.

As will be further described below, the controller 113A may apply a curve fitting algorithm to the matrix of entries to generate a mathematical equation in terms of $\theta$ and $\varphi$ that is a best fit for the data in the matrix of data entries, in one embodiment. Rather than store the matrix of data entries which requires the transceiver system 101A to have significant storage capacity due to the size of the matrix of data entries, the combining module 211 stores the mathematical equation that represents the matrix of data entries.

The device model storage 115A is configured to store the device model 127A generated by the controller 113A. The device model storage 115A includes memory that stores the device model 127 for the transceiver 105A. As mentioned above, the stored device model 127A may be a matrix of data entries or a mathematical equation that is representative of the data entries in the matrix. In one embodiment, the device model storages 115 are accessible by the user application 121 such that the device models are viewable via the user application 121.

The location storage 135A is a database configured to store locations of the transceivers 105A to 105N of transceiver system 101A as well as the location of transceivers included in transceiver system 101B. By storing the locations of the different transceivers, the transceiver 105A is aware of the different transceivers in the location tracking environment 100A. In one embodiment, the location storage 135A may include a plurality of locations for each of the transceivers 105A to 105N of transceiver system 101A and the transceivers included in the transceiver system 101B where each location is associated with a particular time and date. Thus, the location storage 135A may track how the locations of the different transceivers change over time.

As mentioned above, the description of the above components of the transceiver 105A are applicable to the components of transceiver 105N. However, in the embodiment of FIG. 1A, note that the transceiver 105N includes its own controller 113N that generates the device model 127N of transceiver 105N that is stored in the device model storage 115N. Thus, each transceiver 105A to 105N includes its own dedicated controller 113 for generating the device model of the respective transceiver, its own dedicated device model storage 115 for storing the generated device model 127, and its own dedicated location storage 135 for storing the location of the different transceivers in the location tracking environment 100A.

Transceiver system 101B also includes one or more transceivers similar to transceiver 105A to 105N included in transceiver system 101A although not shown in FIG. 1A. Each transceiver included in transceiver system 101B also includes a radiating block having one or more RF sensors, a non-radiating block, a controller, device model storage, and a location storage that each performs similar functionality as the like components described with respect to the transceiver system 101A shown in FIG. 1A. Thus, the description for the transceivers of the transceiver system 101B are omitted for ease of readability.

System Environment According to Second Embodiment

Figure 1B:
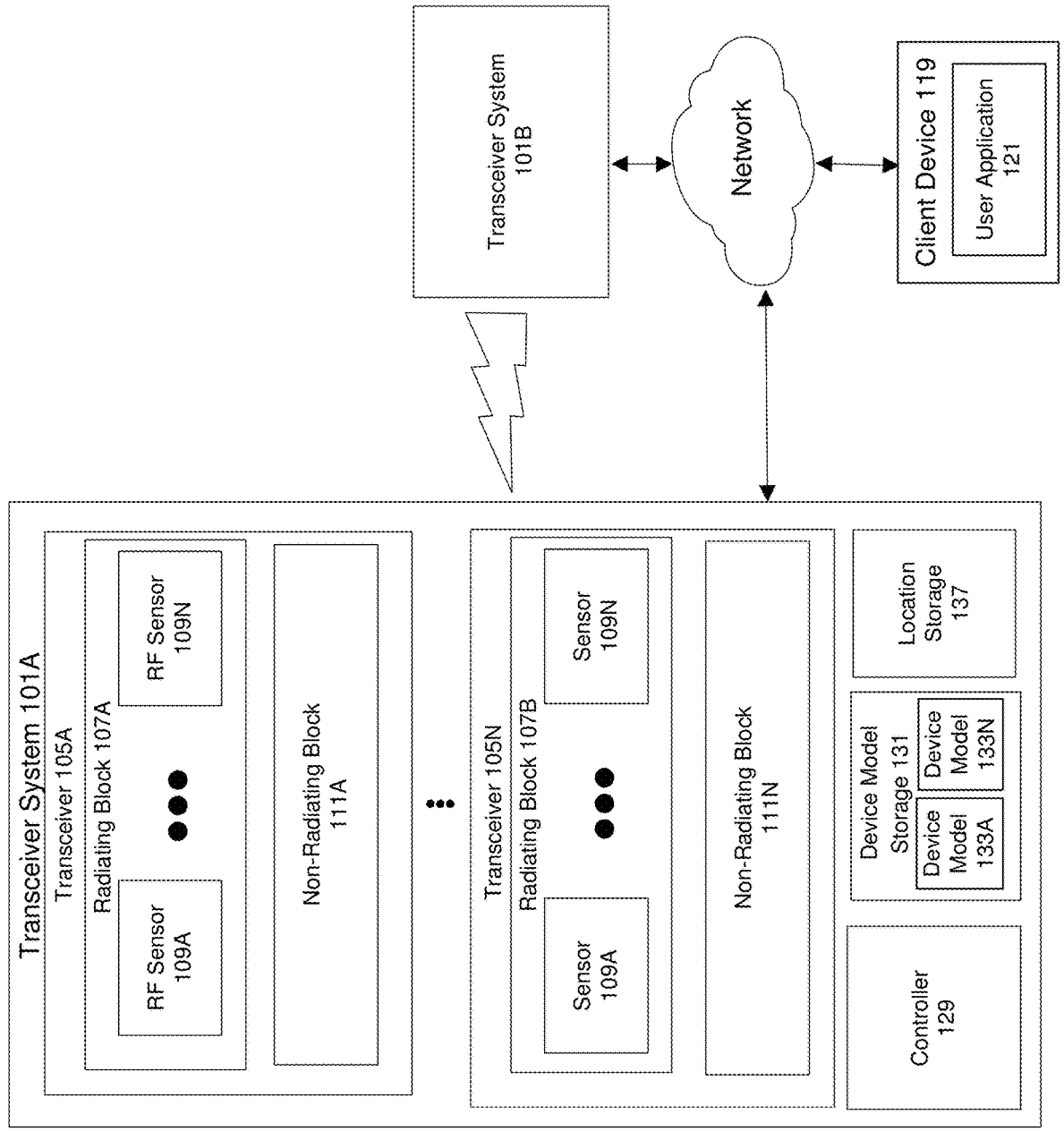
FIG. 1B illustrates a location tracking environment according to a second embodiment.

FIG. 1B is a location tracking environment 100B that includes a transceiver system 101A, a transceiver system 101B, and a client device 119 according to the second embodiment. The second embodiment of the location tracking environment 100B includes similar components as the location tracking environment 100A and the description of the components in FIG. 1A is applicable to FIG. 1B unless specified otherwise.

In contrast to FIG. 1A, the transceiver system 101A in location tracking environment 100B shown in FIG. 1B includes a controller 129 that is shared by the one or more transceivers 105A to 105N in comparison to the transceiver system 101A in location tracking environment 100A in FIG. 1A where each transceiver 105A to 105N has its own dedicated controller 113. In the second embodiment of the location tracking environment 100B, the controller 129 is configured to generate the device model of each of the transceivers 105A to 105N included in the transceiver system 101A. Thus, the controller 129 generates a device model for transceiver 105A and a device model for transceiver 105N for example.

The device model storage 131 stores device models generated by the controller 129. In contrast to the device model storage 115 included in each transceiver in FIG. 1A that stores the device model of its respective transceiver, the device model storage 131 is a common storage that stores the device models of multiple transceivers included in the transceiver system 101A. For example, the device model storage 131 may store the device model 133A for transceiver 105A and device model 133N for transceiver 105N. In one embodiment, the device model storage 131 is accessible by the user application 121 such that the device models are viewable via the user application 121.

In one embodiment, the device model storage 131 that is common to the multiple transceivers in the transceiver system 101A is stored in a storage that is remote from the transceiver system 101A. The transceiver system 101A may fetch device models from the remote device model storage using network 125, for example.

The location storage 137 is a database configured to store locations of the transceivers 105A to 105N of transceiver system 101A as well as the location of transceivers included in transceiver system 101B. The location storage 137 is a common storage that stores locations of the different transceivers from transceiver system 101A and transceiver system 101B. In one embodiment, the location storage 137 may include a plurality of locations for each of the transceivers 105A to 105N of transceiver system 101A and the transceivers included in the transceiver system 101B where each location is associated with a particular time and date. Thus, the location 137 may track how the locations of the different transceivers change over time.

The transceiver system 101B also includes one or more transceivers similar to transceiver 105A to 105N included in transceiver system 101A shown in FIG. 1B. Thus, each transceiver included in transceiver system 101B also includes a radiating block having one or more RF sensors, a non-radiating block, a controller shared by each transceiver, a shared device model storage, and a shared location storage that each perform similar functionality as the like components described with respect to the transceiver system 101A in FIG. 1B. Thus, the description for the transceivers of the transceiver system 101B are omitted for ease of readability.

Controller 113/129

Figure 2:
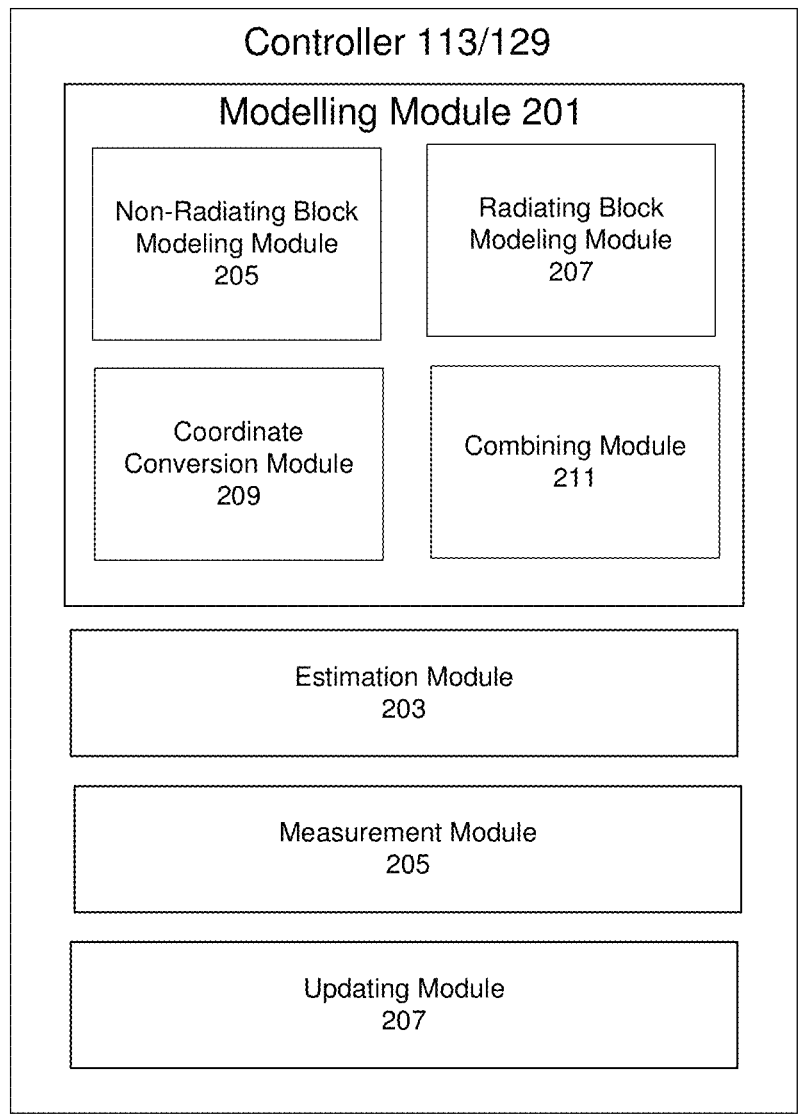
FIG. 2 illustrates a detailed view of a controller according to an embodiment.

FIG. 2 illustrates a detailed view of the controller 113/129 according to one embodiment. The controller 113/129 shown in FIG. 2 is applicable to the first embodiment of the location tracking environment 100A shown in FIG. 1A where each transceiver 105A to 105N has its own dedicated controller 113 as well as the second embodiment of the location tracking environment 100B shown in FIG. 1B where a single controller 129 is shared amongst the transceivers 105A to 105N. As shown in FIG. 2, the controller 113/129 includes a modelling module 201, an estimation module 203, a measurement module 205, and an updating module 207 according to one embodiment. The controller 113/129 may include other modules than those shown in FIG. 2 in other embodiments.

Generally, the modelling module 201 generates the device model of a transceiver 105. The modelling module 201 generates the device model of the transceiver 105 by generating a model of the radiating block 107 of the transceiver 105 and a model of the non-radiating block 111 of the transceiver 105. The modelling module 201 combines the generated models of the radiating block 107 and the non-radiating block 111 to create the device model of the transceiver 105.

In one embodiment, a user may receive the transceiver 105 without a device model of the transceiver 105 being pre-loaded with the transceiver 105. The modelling module 201 may by initiated by the user to generate the device model of the transceiver 105. Alternatively, a user may receive the model of the transceiver 105 from a third-party source that generates the model of the transceiver using another instance of the modelling module 201 located at the third-party source. In another example, the transceiver 105 is pre-configured with the device model 105 by the manufacturer of the transceiver 105.

In one embodiment, the modeling module includes a non-radiating block (NRB) modeling module 205, a radiating block (RB) modeling module 207, a coordinate conversion module 209, and a combining module 211. The modelling module 201 may have additional or fewer modules than shown in FIG. 2 in other embodiments. The described operations of the different modules may be embodied in software, firmware, hardware, or any combinations thereof.

The NRB modeling module 205 generates a model of the non-radiating block 111 of a given transceiver 105 being modeled. In one embodiment, the model of the non-radiating block 111 of a given transceiver is a representation of the non-radiating components included in the non-radiating block 111 of the transceiver 105. In particular, the model of the non-radiating block 111 describes the electrical behavior of non-radiating components of the transceiver 105 when undergoing stimuli by electrical signals such as an incoming RF signal.

In one embodiment, the NRB modeling module 205 generates the model of the non-radiating block 111 of a given transceiver 105 using the scattering parameters (e.g., S-parameters) of the non-radiating components of the transceiver 105. Examples of scattering parameters include gain, return loss, voltage standing wave ratio (VSWR), reflection coefficient and amplifier stability. Each non-radiating component included in the non-radiating block 111 of the transceiver 105 is associated with its own scattering parameters that describe the non-radiating components electrical response characteristics. The scattering parameters of each non-radiating component in the non-radiating block are provided in a technical specification provided by a manufacturer of the non-radiating block 111 of the transceiver 105.

In one embodiment, the NRB modelling module 205 generates the model of the non-radiating block 111 of the transceiver 105 by combining the scattering parameters of the non-radiating components included in the non-radiating block 111 of the transceiver 105 using Mason's Rule (e.g., Mason's gain formula) shown below:

$$G = \frac{y_{out}}{y_{in}} = \frac{\sum_{k=1}^{N} G_k \Delta_k}{\Delta}$$

$$\Delta = 1 - \sum L_i + \sum L_i L_j - \sum L_i L_j L_k + \ldots + (-1)^m \sum \ldots + \ldots$$

In Mason's Rule, $\Delta$ is the determinant of the graph, $y_{in}$ is the input-node variable, $y_{out}$ is the output-node variable, G is the complete gain between $y_{in}$ and $y_{out}$, N is the total number of forward paths between $y_{in}$ and $y_{out}$, $G_k$ is the path gain of the kth forward path between $y_{in}$ and $y_{out}$, $L_i$ is the loop gain of each closed loop in the system, $L_i L_j$ is the product of the loop gains of any two non-touching loops (no common nodes), $L_i L_j L_k$ is the product of the loop gains of any three pairwise non-touching loops, and $\Delta_k$ is the cofactor value of $\Delta$ for the $k^{th}$ forward path, with the loops touching the $k^{th}$ forward path removed. Furthermore, the path describes a continuous set of branches traversed in the direction that they indicate, the forward path describes a path from an input node to an output node in which no node is touched more than once, a loop describes a path that originates and ends on the same node in which no node is touched more than once, the path gain is the product of the gains of all the branches in the path, and the loop gain is the product of the gains of all the branches in the loop.

The RB modeling module 207 generates a model of the radiating block 107 of the transceiver 105 being modeled. In one embodiment, the model of the radiating block 107 of a given transceiver is a representation of the radiating components included in the radiating block 107 of the transceiver 105. In particular, the model of the non-radiating block 111 describes the electrical behavior of radiating components of the transceiver 105 when undergoing stimuli by electrical signals such as the incoming RF signal.

In one embodiment, the RB modeling module 207 generates the model of the radiating block 107 of the transceiver 105 using the scattering parameters (e.g., S-parameters) of the RF sensors 109A to 109N included in the radiating block 107 of the transceiver 105. Examples of scattering parameters of the RF sensors 109 include gain, return loss, voltage standing wave ratio (VSWR), reflection coefficient and amplifier stability. Each of RF sensors 109A to 109N is associated with its own scattering parameters that describe the RF sensor's electrical response characteristics. The scattering parameters of each RF sensor 109 in the radiating block 107 is provided in a technical specification provided by a manufacturer of the RF sensor 109.

In another embodiment, the RB modeling module 207 generates the model of the radiating block 107 of the given transceiver 105 further based on radiation patterns of the RF sensors 109A to 109N of the transceiver 105 in addition to the scattering parameters of the RF sensors 109A to 109N. The radiation pattern of a given RF sensor 109 under test describes the radiation pattern of the RF sensor 109 when all other RF sensors included in the radiating block 107 are terminated by a reference load. In one embodiment, the reference load is 50-Ohm.

The radiation patterns of the RF sensors 109A to 109N included in the radiating block 107 may be determined according to various methodologies including measurement, analytical calculation, and simulation. The resulting radiation patterns of the RF sensors 109A to 109N included in the radiating block 107 of a transceiver 105 are with respect to a local coordinate system (LCS) of the radiating block 107. In one embodiment, the LCS of the radiating block 107 is the Cartesian coordinate system for a three dimensional space defined by the x-axis, y-axis, and z-axis.

In one embodiment, the measurement method for determining the active radiation patterns of the radiating block 107 is performed in an anechoic chamber. During the measurement, a power gain or voltage gain (voltage gain= $\sqrt{\text{powergain}}$), phase, and polarization of the radiating block 107 of the transceiver 105 are measured in addition to the active radiation pattern of the radiating block 107. To perform the measurement, a predefined testing system and a test procedure are used.

FIG. 3A illustrates a testing system 300 for measuring the active radiation pattern of a RF sensor 109 included in the radiating block 107 of a transceiver 105 in an anechoic chamber according to one embodiment. The testing system 300 includes the RF sensor 109 of the transceiver 105 being modeled, a reference antenna 301, a RF power transmitter 303, a measurement circuit 305, and a positioning system 307 in one embodiment. The testing system 300 may include other testing components in other embodiments. The RF sensor 109 under testing is considered the antenna under test (AUT) in one embodiment. Note that all other RF sensors 109 included in the radiating block 107 are terminated by a reference load (e.g., 50-Ohm) so that only a single RF sensor 109 is tested.

The reference antenna 301 is an antenna that has known RF characteristics such as a known gain, radiation pattern, etc. In one embodiment, the reference antenna 301 is separated from the RF sensor 109 by a threshold distance R which is defined by the larger of the reference antenna 301 and the RF sensor 109. In one embodiment, R is defined as follows:

$$R > \frac{2D^2}{\lambda}$$

where D is the largest dimension of the largest antenna (reference antenna 301 or RF sensor 109) and $\lambda$ is the wavelength of the lowest operating frequency of a test signal.

In one embodiment, the RF power transmitter 303 is a circuit that generates the test signal (e.g., a reference wave) that is output by the reference antenna 301 to the RF sensor 109. The RF power transmitter 303 generates the test signal having a known power level and an output frequency that is configurable (e.g., selectable).

In one embodiment, the measurement circuit 305 determines the amount of power that is received by the RF sensor 109. The measurement circuit 305 may include a power meter that measures RF power and is directly connected to terminals of the RF sensor 109 via a transmission line such as a coaxial cable with N-type or SubMiniature version A (SMA) connectors, for example.

In one embodiment, the positioning system 307 is a mechanism configured to rotate the radiating block 107 that includes the RF sensor 109 relative to the reference antenna 301 to measure the radiation pattern of the RF sensor 109 as a function of angle. The positioning system 307 controls the orientation of the radiating block 107 to define the local coordinate system of the radiating block 107. The positioning system 307 rotates the radiating block 107 so that the test signal is received by the RF sensor 109 at a plurality of different angles since the goal of the measurement is to measure the radiation pattern of the radiating block 107 as a function of angle. In one embodiment, the radiation pattern is measured as a function of angle in the spherical coordinate system.

The granularity of step sizes between the different angles of rotation performed by the positioning system 307 is configurable and defines the angular resolution of the model of the radiating block 107. In one embodiment, the reference antenna 301 may be connected to positioning system 307 to rotate the reference antenna 301 instead of the RF sensor 109 being rotated by positioning system 307 or both the reference antenna 301 and the RF sensor 109 are rotated by their respective positioning system.

In one embodiment, the radiation pattern of the RF sensor 109 is specified in terms of the magnitude of the power received or transmitted by the radiating block and the phase of the power. To determine the power and phase of the radiating block 107, measurements are conducted in in two orthogonal directions of theta hat $\hat{\theta}$ (unit vector in $\theta$ direction) and phi hat $\hat{\varphi}$ (unit vector in $\varphi$ direction) in the spherical coordinate system to determine the polarizations of the RF sensor 109 in terms of theta $\theta$ and phi $\varphi$.

Generally, the model of the RF sensor 109 in $\hat{\theta}$ (unit vector in the $\theta$ polarization of the spherical coordinate system) is defined by the following equation E1:

$$a'^{(i)}_\theta(\theta',\varphi',f) = g'^{(i)}_\theta(\theta',\varphi',f) e^{j\psi'^{(i)}_\theta(\theta',\varphi',f)} \quad (E1)$$

where $a'^{(i)}_\theta(\theta',\varphi',f)$ is the array response of the given RF sensor i included in the radiating block 107 in the $\theta$ polarization, $g'^{(i)}_\theta(\theta',\varphi',f)$ is the gain or radiation magnitude response of the given RF sensor i in the $\theta$ polarization, $\theta'$ and $\varphi'$ describe the polarization of the reference antenna 301 in the local coordinate system, and $e^{j\psi'^{(i)}_\theta(\theta',\varphi',f)}$ are complex components of the radiation phase response of the given RF sensor i in the $\theta$ polarization, and f is the frequency of the test signal. In the equation E1, the gain $g'^{(i)}_\theta(\theta',\varphi',f)$ and the radiation phase response $\psi'^{(i)}_\theta(\theta',\varphi',f)$ are unknown. Note that in equation E1, all parameters are denoted as primed "'" which refers to the local coordinate system of the RF sensor 109 under test.

The following description with respect to FIGS. 3B to 3E describes one embodiment of a testing procedure used to determine the gain $g'_\theta{}^{(i)}(\theta',\varphi',f)$ and the radiation phase response $\psi'_\theta{}^{(i)}(\theta',\varphi',f)$ for the RF sensor i in equation E1. Other steps may be performed in the testing procedure to determine the gain $g'_\theta{}^{(i)}(\theta',\varphi',f)$ and the radiation phase response $\psi'_\theta{}^{(i)}(\theta',\varphi',f)$ in equation E1 in other embodiments.

Figure 3B:
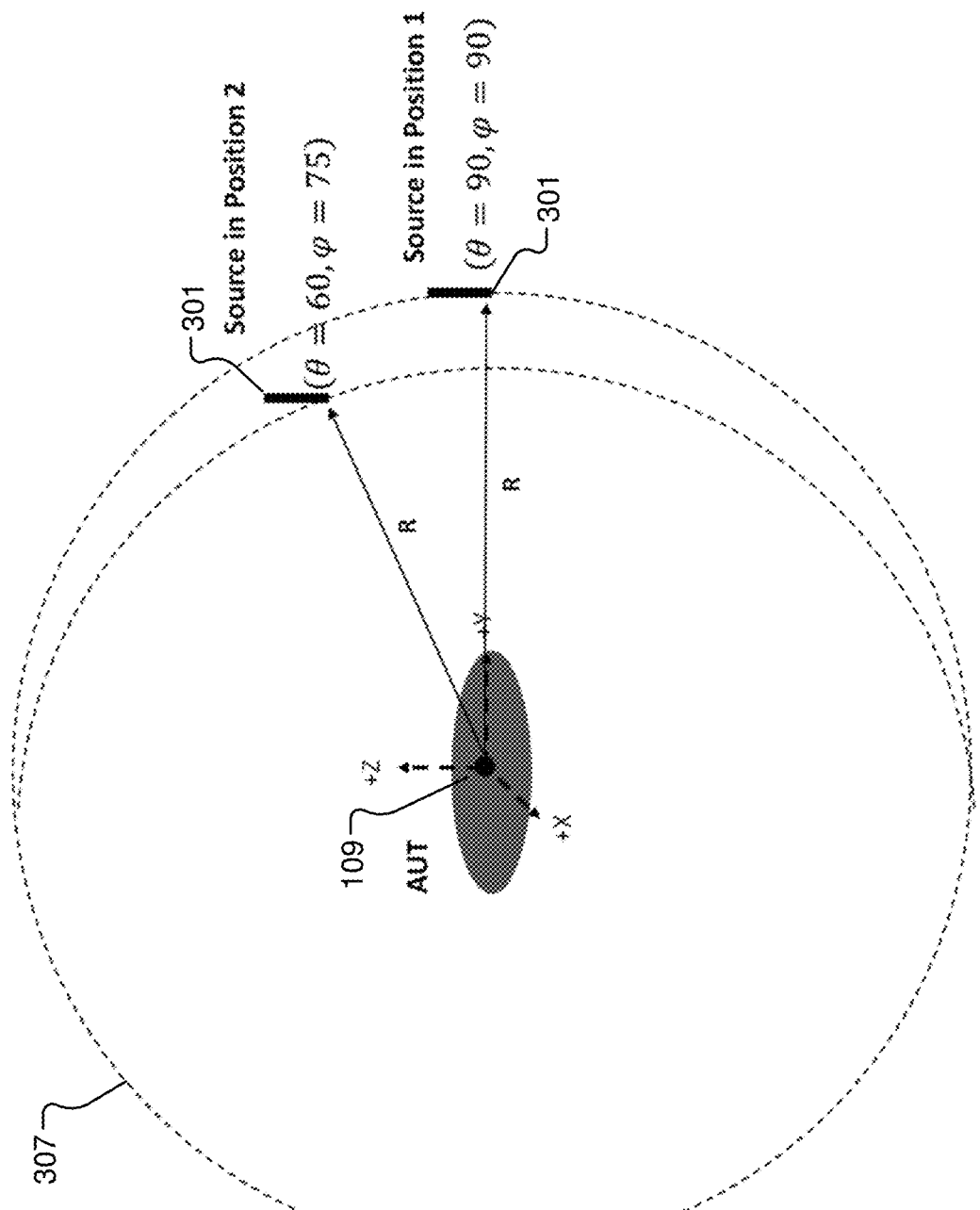

Referring to FIG. 3B, an arrangement of the RF sensor 109 under test and the reference antenna 301 are shown according to one embodiment. As shown in FIG. 3B, in Step 1 of the testing procedure, the radiating block 107 is first placed at the origin of a sphere 307. In Step 2 of the testing procedure, the reference antenna 301 is then placed at position 1 in the direction of $\hat{\theta}$ (unit vector in θ direction) as shown in FIG. 3B. In one embodiment, position 1 is in the spherical coordinate system where θ=90 and φ=90 where R is a constant radius that separates the reference antenna 301 from the RF sensor 109 as previously described above.

Figure 3C:
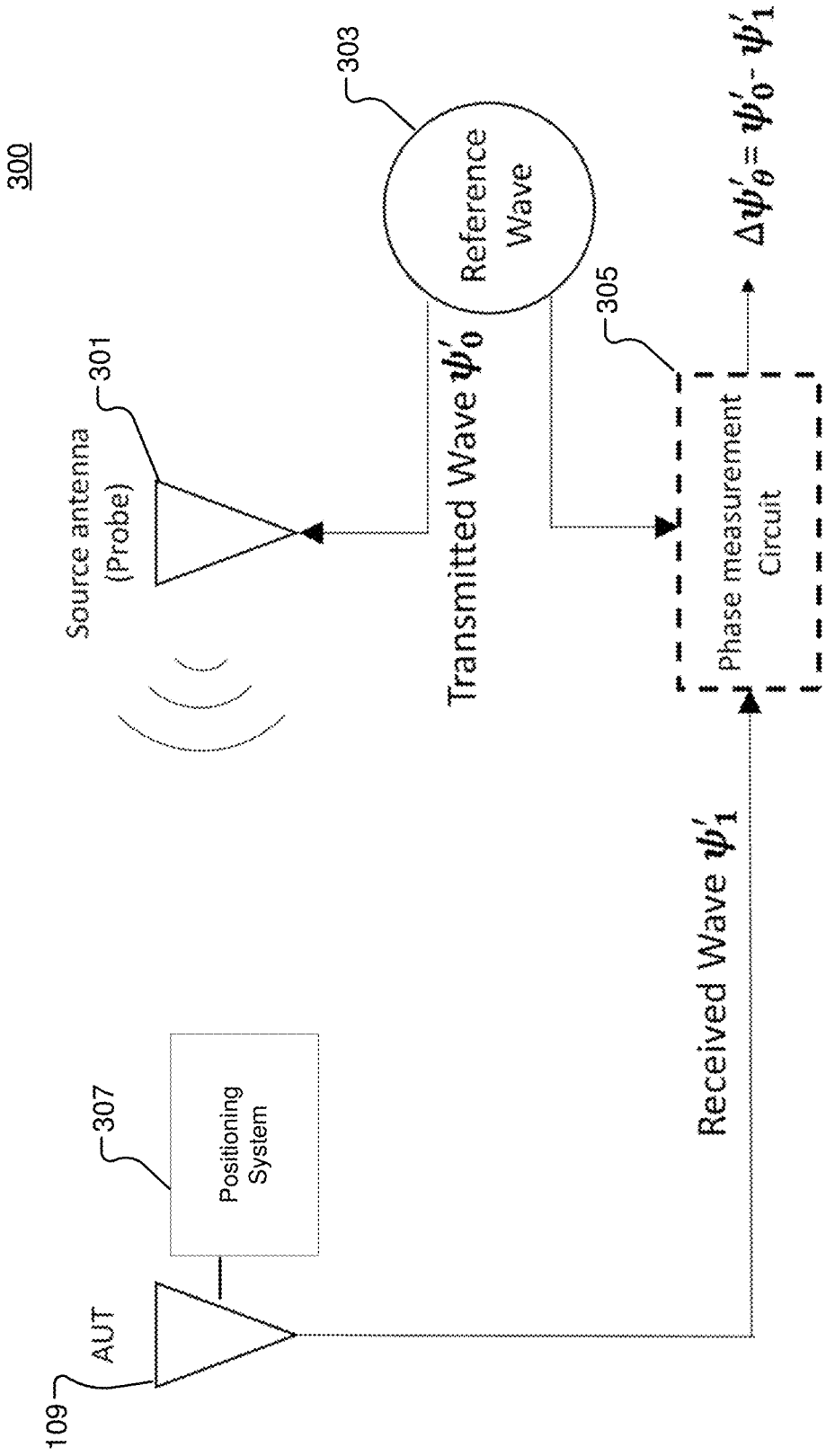

Referring to FIG. 3C, in Step 3 of the testing procedure, while the reference antenna 301 is at position 1, the reference antenna 301 is configured in the transmitting mode and the RF power transmitter 303 generates a test signal (e.g., a reference wave) $\psi'_0$ that is transmitted by the reference antenna 301 to the RF sensor 109 under test. The RF sensor 109 outputs to the measurement circuit 305 test signal $\psi'_1$ in response to receiving test signal $\psi'_0$. Generally, the test signal $\psi'_0$ transmitted by the reference antenna 301 is different from the test signal $\psi'_1$ output by the RF sensor 109. The measurement circuit 305 receives both the test signal $\psi'_1$ from the RF sensor 109 and the transmitted test signal $\psi'_0$ generated by the RF power transmitter 303 and measures the phase difference between the test signals which is represented as $\Delta\psi'_\theta{}^{(1)}(90, 90, f)$ where θ=90 and φ=90 and f is the frequency of the test signal $\psi'_0$.

Figure 3D:
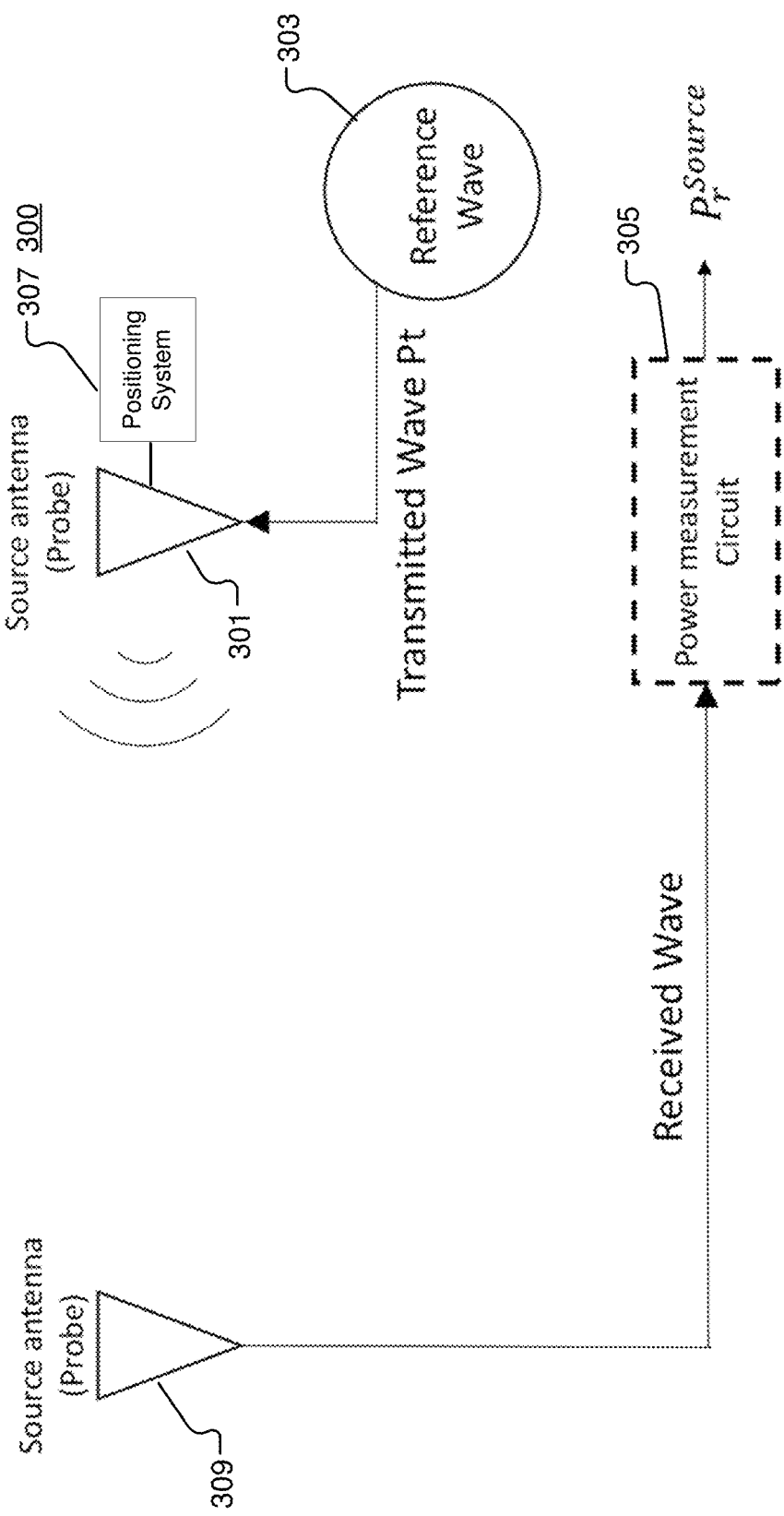

Referring to FIG. 3D, in Step 4 of the testing procedure, another reference antenna 309 replaces the RF sensor 109 and is switched to the receiving mode while the reference antenna 301 is still at position 1. In one embodiment, the reference antenna 301 and the other reference antenna 309 are identical antennas so they have the same properties. The RF power transmitter 303 is connected to the reference antenna 301 and the reference antenna 301 transmits a wave Pt with a known power level to the other reference antenna 309. The other reference antenna 309 outputs the received wave to the measurement circuit 305. The measurement circuit 305 measures the received power $P_r{}^{Source}$ of the wave outputted by the other reference antenna 301 to the measurement circuit 305. Since the other reference antenna 309 and the reference antenna 301 are identical, the received power $P_r{}^{Source}$ of the wave outputted by the other reference antenna 301 is the same for the reference antenna 309.

Figure 3E:
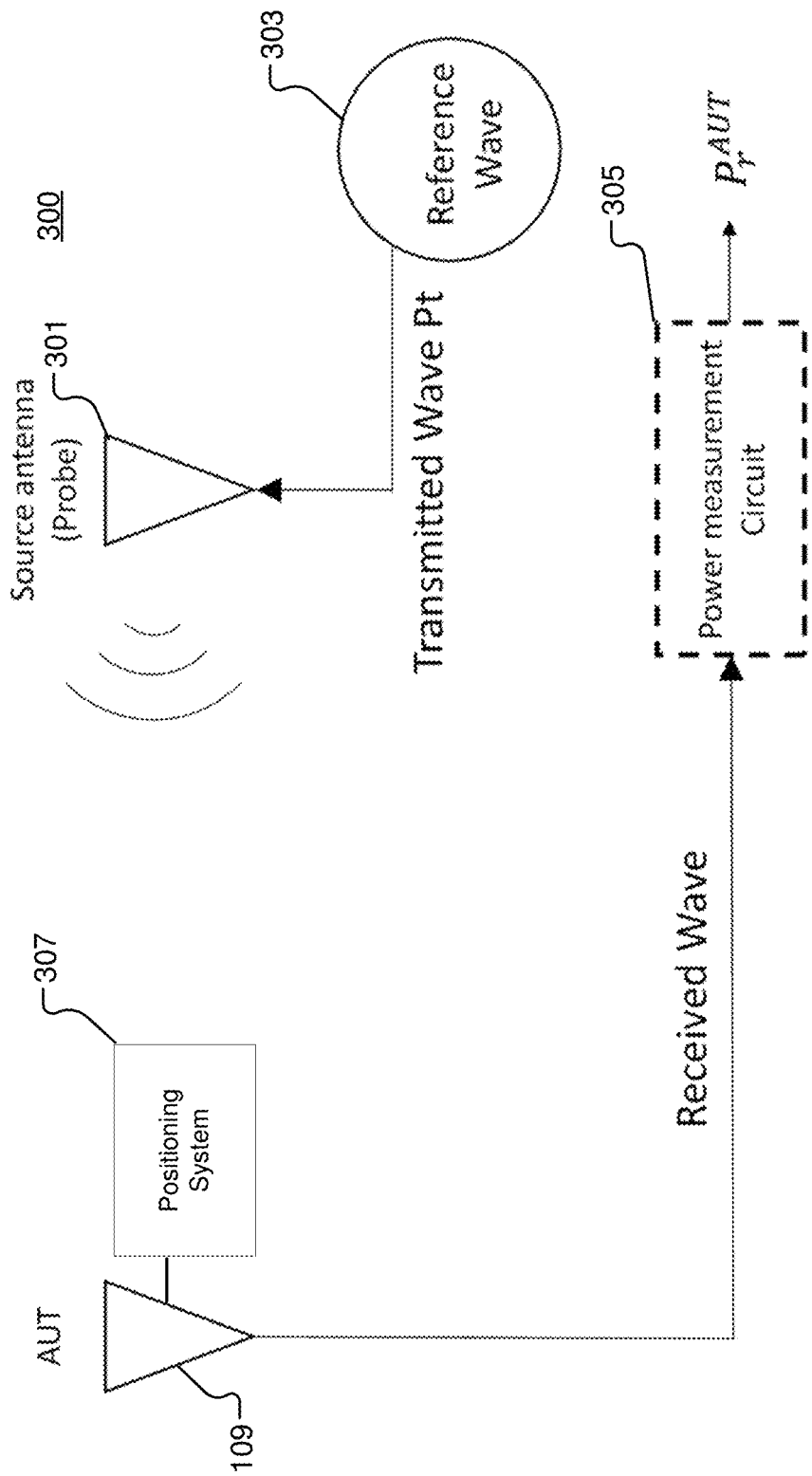

Referring to FIG. 3E, in Step 4 of the testing procedure, the RF sensor 109 replaces the other reference antenna 309 and is switched to the receiving mode. The RF power transmitter 303 is connected to the reference antenna 301 and the reference antenna 301 transmits a wave Pt with a known power level to the RF sensor 109. The RF sensor 109 outputs the received wave to the measurement circuit 305. The measurement circuit 305 measures the received power $P_r{}^{AUT}$ of the wave outputted by the RF sensor 109 to the measurement circuit 305.

Since the gain of the reference antenna 301 is known, the radiating block modeling module 207 can calculate the voltage gain response $g'_\theta{}^{(i)}(\theta'=90,\varphi'=90,f)$ of the RF sensor 109. In one embodiment, the radiating block modeling module 207 calculates the voltage gain response $g'_\theta{}^{(i)}(\theta'=90,\varphi'=90,f)$ of the RF sensor 109 according to equation E3 as follows:

$$g_\theta'^{(i)}(\theta'=90, \varphi'=90, f) = \sqrt{\frac{P_r^{AUT}}{P_r^{Source}} G_r^{Source}} \quad (E3)$$

where $P_r{}^{AUT}$ is the power of the wave outputted by the radiating block 107, $P_r{}^{Source}$ is the power of the wave outputted by the reference antenna 301, and $G_r{}^{Source}$ is the gain response of the reference antenna 301.

Similar to equation E1, the device model of the RF sensor 109 in $\hat{\varphi}$ (unit vector in φ direction of the spherical coordinate system) is defined by the following equation E2:

$$a'_\varphi{}^{(i)}(\theta',\varphi',f) = g'_\varphi{}^{(i)}(\theta',\varphi',f) e^{j\psi'_\varphi{}^{(i)}(\theta',\varphi',f)} \quad (E2)$$

where $a'_\varphi{}^{(i)}(\theta',\varphi',f)$ is the array response of the RF sensor i under test in $\hat{\varphi}$, $g'_\varphi{}^{(i)}(\theta',\varphi',f)$ is the voltage gain response of the given RF sensor i in $\hat{\varphi}$, θ' and φ' describe the polarization of the reference antenna 301 in the local coordinate system, and $e^{j\psi'_\varphi{}^{(i)}(\theta',\varphi',f)}$ are complex components of the phase response of the given RF sensor i in $\hat{\varphi}$, and f is the frequency of the test signal. In equation E2, the voltage gain response $g'_\varphi{}^{(i)}(\theta',\varphi',f)$ and the complex phase component $\psi'_\varphi{}^{(i)}(\theta',\varphi',f)$ are unknown. Note that in equation E2, all parameters are denoted as primed "'" which refers to the local coordinate system of the RF sensor 109 under test.

Referring back to FIG. 3B, in Step 5 of the testing procedure, Steps 2 through 4 described above are repeated to obtain $g'_\varphi{}^{(i)}(\theta'=90,\varphi'=90,f)$ and $\Delta\psi'_\varphi{}^{(i)}(\theta'=90,\varphi'=90,f)$. As shown in FIG. 3B, the radiating block 107 is again placed at the origin of a sphere 307. Step 2 of the testing procedure described above is repeated for (unit vector in φ direction by first placing the reference antenna 301 at position 1. As described above, position 1 is in the spherical coordinate system where θ=90 and φ=90 where R is a constant radius that separates the reference antenna 301 from the RF sensor 109.

Referring to FIG. 3C, Step 3 of the testing procedure is repeated for $\hat{\varphi}$, where the reference antenna 301 is configured in the transmitting mode at position 1 and the RF power transmitter 303 generates a test signal (e.g., a reference wave) $\psi'_0$ that is transmitted by the reference antenna 301 to the RF sensor 109. The RF sensor 109 outputs the received test signal $\psi'_1$ to the measurement circuit 305. Generally, the test signal $\psi'_0$ transmitted by the reference antenna 301 is different from the test signal $\psi'_1$ output by the radiating block 107. The measurement circuit 305 receives both the received test signal $\psi'_1$ from the radiating block 107 and the transmitted test signal $\psi'_0$ generated by the RF power transmitter 303 and measures the phase difference between the test signals which is represented as $\Delta\psi'_\varphi{}^{(1)}(90, 90, f)$ where θ=90 and φ=90 and f is the frequency of the test signal $\psi'_0$.

Referring to FIG. 3D, Step 4 of the testing procedure is repeated for by switching the reference antenna 301 from the transmitting mode to the receiving mode while the reference antenna is still at position 1 and the RF sensor 109 is switched from the receiving mode to the transmitting mode. The RF power transmitter 303 is connected to the RF sensor 109 and the RF sensor 109 transmits a wave Pt with a known power level to the reference antenna 301. The reference antenna 301 outputs the received wave to the measurement circuit 305. The measurement circuit 305 measures the received power $P_r^{Source}$ of the wave outputted by the reference antenna 301 to the RF power transmitter 305.

Referring to FIG. 3E, in Step 4 of the testing procedure the reference antenna 301 is then switched from the receiving mode back to the transmitting mode while the reference antenna is still at position 1 and the RF sensor 109 is switched from the transmitting mode back to the receiving mode. The RF power transmitter 303 is connected to the reference antenna 301 and the reference antenna 301 transmits a wave Pt with a known power level to the RF sensor 109. The RF sensor 109 outputs the received wave to the measurement circuit 305. The measurement circuit 305 measures the received power $P_r^{AUT}$ of the wave outputted by the RF sensor 109 to the measurement circuit 305.

Since the gain of the reference antenna 301 is known, the radiating block modeling module 207 can calculate the voltage gain response $g'^{(i)}_\varphi(\theta'=90,\varphi'=90,f)$ of the RF sensor 109. In one embodiment, the radiating block modeling module 207 calculates the voltage gain response $g'^{(i)}_\varphi(\theta'=90,\varphi=90,f)$ of the RF sensor 109 according to equation E4 as follows:

$$g'^{(i)}_\varphi(\theta'=90, \varphi'=90, f) = \sqrt{\frac{P_r^{AUT}}{P_r^{Source}} G_r^{Source}} \quad (E4)$$

where $P_r^{AUT}$ is the power of the wave outputted by the radiating block 107, $P_r^{Source}$ is the power of the wave outputted by the reference antenna 301, and $G_r^{Source}$ is the gain response of the reference antenna 301.

In Step 6 of the testing procedure, Steps 2 through 5 described above are repeated for a plurality of points in the spherical coordinate system in both the θ and φ directions at the radius R. For example, at position 1 the radiating block 107, the reference antenna 301, or both the radiating block 107 and the reference antenna 301 are rotated at different angles in the θ and φ directions. Based on the resulting measurements described above with respect to Steps 2 through 5 for each angle in the θ and φ directions, the radiating block modeling module 207 calculates the voltage gain response $g'^{(i)}_\theta(\theta',\varphi',f)$ and voltage gain response $g'^{(i)}_\varphi(\theta',\varphi',f)$ for the particular polarizations θ' and φ'.

In one embodiment, one of the measurements in Steps 2 through 5 is used as a reference measurement in order to calculate the phase of the absolute radiation pattern. For example, the measured phase difference $\Delta\psi'^{(1)}_\theta(90, 90,f)$ is used as a reference measurement. The radiating block modelling module 207 calculates a difference between the reference measurement and all other measured phase differences $\Delta\psi'^{(1)}_\theta$ and $\Delta\psi'^{(1)}_\varphi$ at the different polarizations θ' and φ' resulting from the RF sensor 109, the reference antenna 301, or both the RF sensor 109 and the reference antenna 301 being rotated at different angles in the θ and φ directions. As a result of the calculations, the radiating block modelling module 207 generates the phase response $\psi'^{(1)}_\theta(\theta',\varphi',f)$ in the θ direction and the phase response $\psi'^{(1)}_\varphi(\theta',\varphi',f)$ in the φ direction for a plurality of angles of θ and φ. Thus, the radiating block modeling module 207 has determined the voltage gain response $g'^{(1)}_\theta(\theta',\varphi',f)$, the voltage gain response $g'^{(1)}_\varphi(\theta',\varphi',f)$, the phase response $\psi'^{(1)}_\theta(\theta',\varphi',f)$, and the phase response $\psi'^{(1)}_\varphi(\theta',\varphi',f)$ for a single RF sensor 109.

In one embodiment, Steps 1 through 6 described above are repeated for each RF sensor 109 included in the radiating block 107 of the transceiver 105 that is being modeled. Once all of the RF sensors 109 included in the radiating block 107 is tested according to the testing procedure described above, the array response $a'^{(i)}_\theta(\theta',\varphi',f)$ in the θ polarization and the array response $a'^{(i)}_\varphi(\theta',\varphi',f)$ in the φ polarization are obtained for all of the different RF paths of the radiating block 107.

As mentioned above, the radiation patterns of the RF sensors 109A to 109N included in the radiating block 107 may also be determined using analytical and simulation methodologies. Briefly, the analytical method is used if the RF sensors 109A to 109N are conventional antenna elements where the radiation patterns can be obtained in form of explicit expressions like Dipoles, Monopoles, etc. The simulation methodology uses finite element method (FEM) simulation or methods of moments (MOM) simulations to perform the testing procedure described above in a virtual simulation environment of the testing system 300.

In one embodiment, the active radiation pattern of an i-th RF sensor 109A to 109N in the local coordinate system is represented by equation E5 shown below.

$$\begin{cases} a'^{(i)}_\theta(\theta', \varphi', f) = g'^{(i)}_\theta(\theta', \varphi', f)e^{j\psi'^{(i)}_\theta(\theta',\varphi',f)} \\ a'^{(i)}_\varphi(\theta', \varphi', f) = g'^{(i)}_\varphi(\theta', \varphi', f)e^{j\psi'^{(i)}_\varphi(\theta',\varphi',f)} \end{cases} \quad (E5)$$

where $g'^{(i)}_\theta(\theta',\varphi',f), \psi'^{(i)}_\theta(\theta',\varphi',f), g'^{(i)}_\varphi(\theta',\varphi',f), \psi'^{(i)}_\varphi(\theta',\varphi',f)$ are four independent parameters which describes the radiation properties of the i-th RF sensor 109 of the radiating block 107 where a frequency component is denoted by f. As mentioned previously, $g'^{(i)}_\theta(\theta',\varphi',f)$ is the gain or radiation magnitude response in the θ' polarization and local coordinate system and $g'^{(i)}_\varphi(\theta',\varphi',f)$ is the gain or radiation magnitude response in the φ' polarization and local coordinate system. Furthermore, $\psi'^{(i)}_\theta(\theta',\varphi',f)$ is the radiation phase response in the θ polarization and the local coordinate system and $\psi'^{(i)}_\varphi(\theta',\varphi',f)$ is the radiation phase response in the φ' polarization and the local coordinate system.

Referring back to FIG. 2, the coordinate conversion module 209 converts the active radiation pattern of the RF sensors 109A to 109N (e.g., equation E5) that are in the local coordinate system to a global coordinate system. In one embodiment, the global coordinate system is the Earth-centered inertial (ECI) frame which is a global reference frame that has its origin at the center of the Earth. However, other global coordinate systems may be used such as a geocentric coordinate system where each point in space is specified by their latitude and longitude and the directions towards North, South, West and East.

In one embodiment, the coordinate conversion module 209 uses a 9-axis inertial measurement system (IMU) to define the global coordinate system. The IMU may include 3-axis accelerometers, 3-axis gyroscopes, and 3-axis magnetometers to provide the global coordinate system origin, for example.

Once the origin of the global coordinate system is defined, the coordinate conversion module 209 uses a total rotation matrix R shown in equation E6 shown below to convert the active radiation pattern of the RF sensors 109A to 109N (e.g., equation E5) that are in the local coordinate system to the global coordinate system.

$$R = R_z(\alpha)R_y(\beta)R_x(\gamma) = \begin{pmatrix} \cos(\alpha) & -\sin(\alpha) & 0 \\ \sin(\alpha) & \cos(\alpha) & 0 \\ 0 & 0 & 1 \end{pmatrix} \begin{pmatrix} \cos(\beta) & 0 & \sin(\beta) \\ 0 & 1 & 0 \\ -\sin(\beta) & 0 & \cos(\beta) \end{pmatrix} \begin{pmatrix} 1 & 0 & 0 \\ 0 & \cos(\gamma) & -\sin(\gamma) \\ 0 & \sin(\gamma) & \cos(\gamma) \end{pmatrix} \quad (E6)$$

The total rotation matrix R is a transformation matrix that is used to perform a rotation on the spherical coordinate components of the active radiation pattern of the RF sensors 109A to 109N that are in the local coordinate system to the global coordinate system. In the total rotation matrix R, the x-axis is represented by $\gamma$, the y-axis is represented by $\beta$, and the z-axis is represented by $\alpha$.

The coordinate conversion module 209 rotates the spherical coordinate components ($\theta'$,$\varphi'$) of the active radiation pattern of the RF sensors 109A to 109N that are in the local coordinate system to ($\theta$,$\varphi$) in the global coordinate system by solving for ($\theta$,$\varphi$) using equation E7 and equation E8 shown below.

$$\begin{pmatrix} \sin\theta\cos\varphi \\ \sin\theta\sin\varphi \\ \cos\theta \end{pmatrix} = R \begin{pmatrix} \sin\theta'\cos\varphi' \\ \sin\theta'\sin\varphi' \\ \cos\theta' \end{pmatrix} \quad (E7)$$

$$\begin{pmatrix} 0 \\ a_\theta^{(i)}(\theta, \varphi, f) \\ a_\varphi^{(i)}(\theta, \varphi, f) \end{pmatrix} = A_c^s R A_s^c \begin{pmatrix} 0 \\ a_\theta'^{(i)}(\theta', \varphi', f) \\ a_\varphi'^{(i)}(\theta', \varphi', f) \end{pmatrix} \quad (E8)$$

In equation E8, the array responses $a_\theta^{(i)}(\theta,\varphi,f)$, $a_\varphi^{(i)}(\theta,\varphi,f)$ are the $\theta$ and $\varphi$ components of device model in global coordinate system at ($\theta$,$\varphi$) derived from equation E7. $A_c^s$ is the Cartesian to Spherical Coordinate System Conversion Matrix and $A_s^c$ is the Spherical to Cartesian Coordinate System Conversion Matrix. In one embodiment, $A_c^s$ is represented by equation E9 and $A_s^c$ is represented by equation E10 shown below.

$$A_c^s = \begin{pmatrix} \sin\theta\cos\varphi & \sin\theta\sin\varphi & \cos\theta \\ \cos\theta\cos\varphi & \cos\theta\sin\varphi & -\sin\theta \\ -\sin\varphi & \cos\varphi & 0 \end{pmatrix} \quad (E9)$$

$$A_s^c = \begin{pmatrix} \sin\theta'\cos\varphi' & \cos\theta'\cos\varphi' & -\sin\varphi' \\ \sin\theta'\sin\varphi' & \cos\theta'\sin\varphi' & \cos\varphi' \\ \cos\theta' & -\sin\theta' & 0 \end{pmatrix} \quad (E10)$$

Using equations E8, E9, and E10, the coordinate conversion module 209 converts the array response $a'_\theta{}^{(i)}(\theta',\varphi',f)$ and array response $a'_\varphi{}^{(i)}(\theta',\varphi',f)$ of the radiating block 107 that are in the local coordinate system to the global coordinate system. Thus, the device model of the radiating block 107 includes the array responses $a_\theta^{(i)}(\theta,\varphi,f)$, $a_\varphi^{(i)}(\theta,\varphi,f)$ of all of the RF sensors 109A to 109N of the radiating block 107 that are in the global coordinate system and the scattering parameters of the RF sensors 109A to 109N of the radiating block 107.

Referring back to FIG. 2, the combining module 211 combines the device model of the non-radiating block 111 and the device model of the radiating block 107 of the transceiver 105 that is being modeled, together with consideration of the connection structure between the radiating block 107 and the non-radiating block 111, to generate the device model of the transceiver 105. The device model of the transceiver 105 is also dependent on the connection structure between the radiating block 107 and the non-radiating block 111 as the connection structure impacts the signal path through the transceiver 105.

In one embodiment, the non-radiating block 111 includes a plurality of first ports and the radiating block 107 includes a plurality of second ports. Each of the plurality of second ports of the radiating block 107 is connected to a corresponding one of the plurality of RF sensors 109A to 109N.

The second ports of the radiating block 107 are also connected to the first ports of the non-radiating block 111 to connect together the radiating block 107 and the non-radiating block. Thus, unlike under the testing procedure where a RF sensor 109 that is not undergoing test is connected to a reference load (e.g., 50-Ohm), each second port of the radiating block 107 is connected to a corresponding first port of the non-radiating block 111.

The first ports of the non-radiating block 111 and the second ports of the radiating block 107 may be connected in different connection arrangements where each connection arrangement provides a different pathway for a RF signal. Each possible pathway in the transceiver 107 may have a different response characteristic to an incoming RF signal. Thus, the final device model of the transceiver 105 is dependent on the connection structure of the ports of the non-radiating block 111 and the radiating block 107 in addition to the device models of the radiating block 107 and the non-radiating block 111.

Figure 4A:
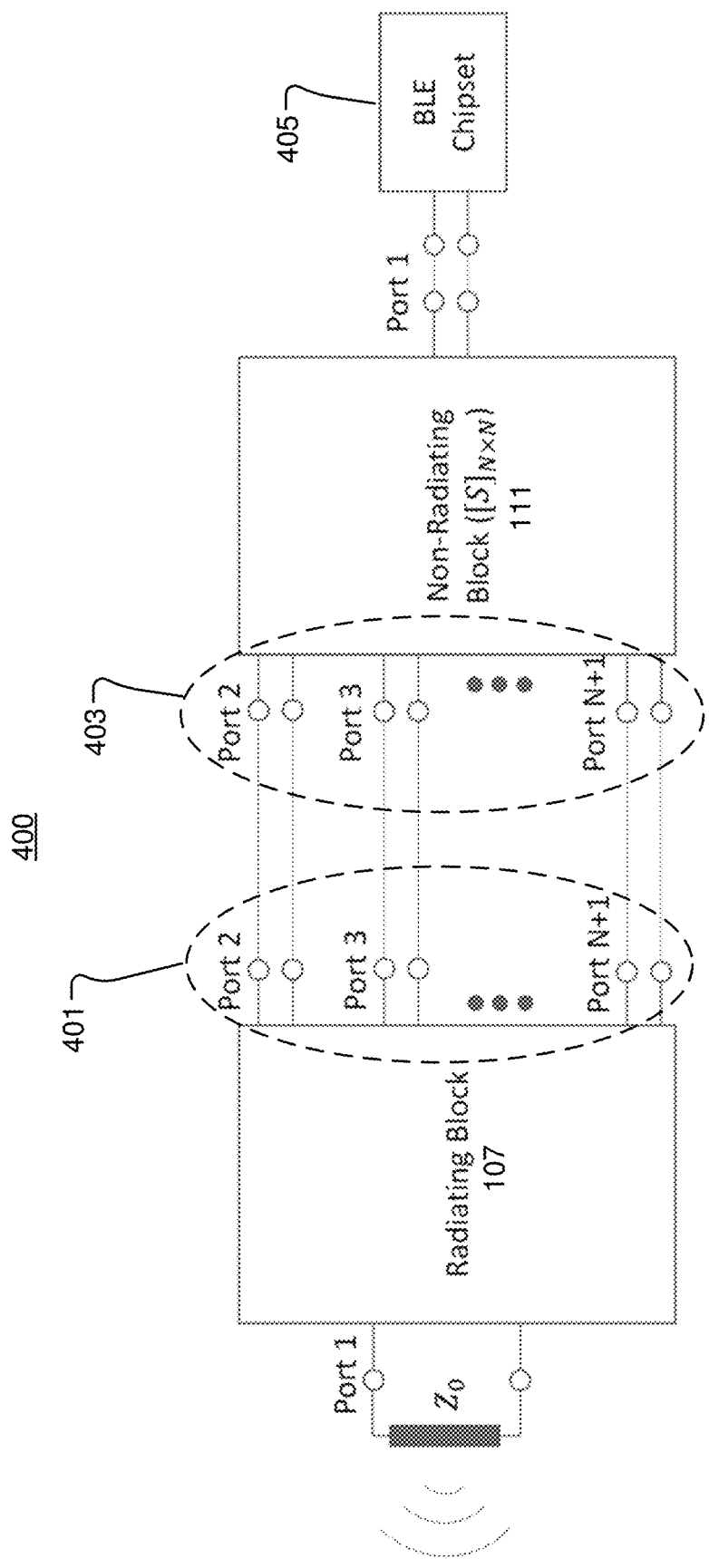
FIGS. 4A to 4B illustrate a connection structure of a radiating block and a non-radiating block of a transceiver according to an embodiment.

FIG. 4A illustrates one embodiment of a connection structure 400 of the radiating block 107 and the non-radiating block 111. The non-radiating block 111 includes a plurality of first ports 403 including ports 1 to port N+1 and the radiating block 107 includes a plurality of second ports 401 including ports 1 to port N. As shown in FIG. 4A, port 1 of the radiating block is connected to port 2 of the non-radiating block 111, port 2 of the radiating block 107 is connected to port 3 of the non-radiating block 111, and port N of the radiating block 107 is connected to port N+1 of the non-radiating block 111. Port 1 of the non-radiating block 111 is connected to a radio 405 (e.g., a BLE (Bluetooth Low Energy) chipset).

Figure 4B:
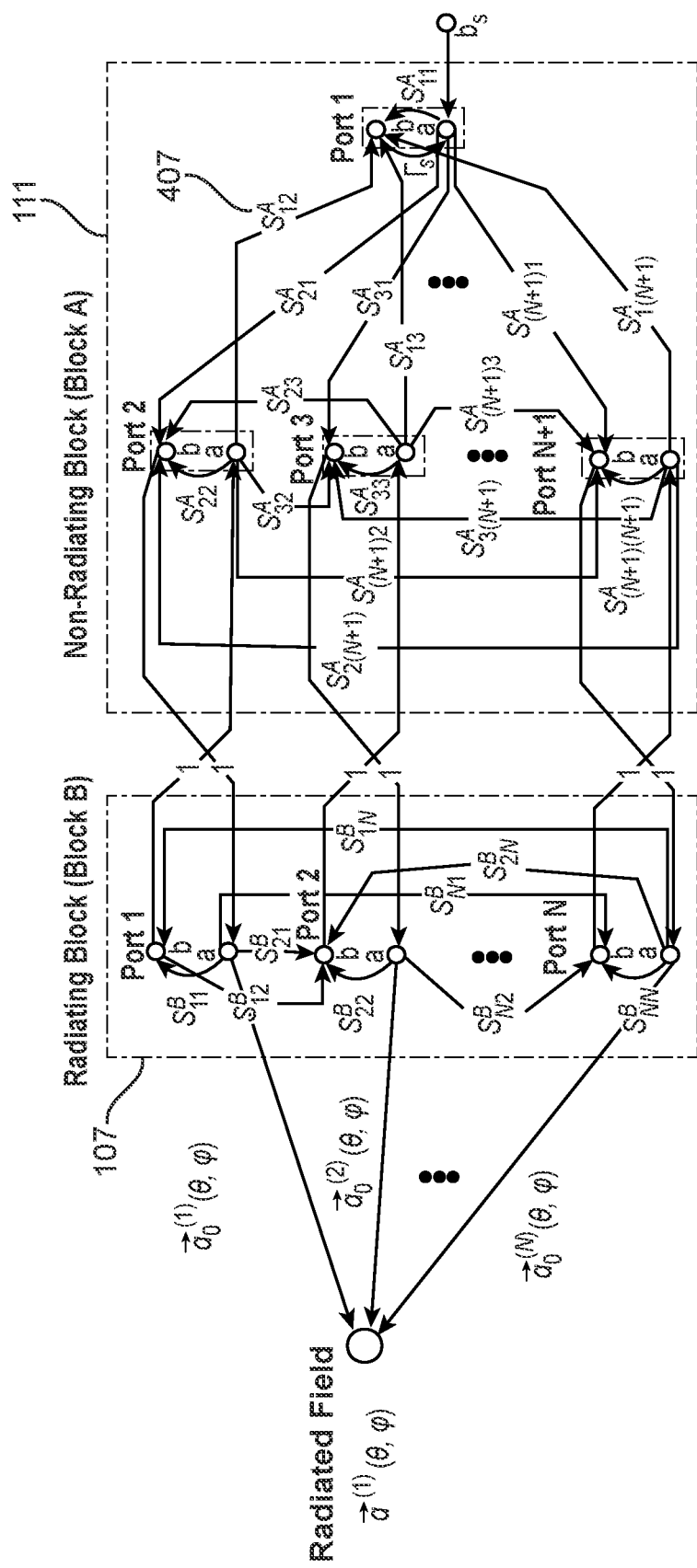

FIG. 4B illustrates one embodiment of a flow-graph of the connection structure 400 of the radiating block 107 and the non-radiating block 111 shown in FIG. 4A. FIG. 4B illustrates the scattering parameters for the non-radiating components between the first ports of the non-radiating block 111 such as scattering parameter 407. Each second port 401 included in the radiating block 107 and each first port 403 included in the non-radiating block 111 is modeled by a respective incident power wave "a" and a reflect wave "b". As shown in FIG. 4B, each port includes a scattering parameter associated with the incident power wave "a" and the reflect wave "b" of the port. In one embodiment, the final device model for the j-th elements in terms of the activation radiation patterns in vector form is shown in equation E11 shown below.

$$\vec{a}^{(j)}(\theta, \varphi, f) = \sum_{i=1}^{N} \alpha_i^{(j)} \vec{a}_0^{(i)}(\theta, \varphi, f) \quad (E11)$$

In equation E11, the active radiation patterns in the global coordinate system $a_0^{(i)}$ was previously solved for where $\vec{a}_0^{(i)}(\theta,\varphi,f) = a_\theta^{(i)}(\theta,\varphi,f)\hat{\theta} + a_\varphi^{(i)}(\theta,\varphi,f)\vec{\varphi}$. The combining module 211 solves for $\alpha_i^{(j)}$ using the final Mason's rule shown in equation E12 below. Note that $\alpha_i^{(j)}$ is dependent on the network connection between the different ports of the radiating block 107 and the non-radiating block 111 as well as what switches and/or other components of the non-radiating block 111 are enabled. Thus, $\alpha_i^{(j)}$ may change depending on the network connection between the different ports of the radiating block 107 and the non-radiating block 111.

$$\vec{a}^{(j)}(\theta, \varphi, f) =$$

$$\frac{P_1 \left[1 - \sum \mathcal{J}(1)^{(1)} + \sum \mathcal{J}(2)^{(1)} - \ldots\right] +}{1 - \sum \mathcal{J}(1) + \sum \mathcal{J}(2) - \sum \mathcal{J}(3) + \ldots} = \sum_{i=1}^{N} \alpha_i^{(j)} \vec{a}_0^{(i)}(\theta, \varphi, f) \quad \text{(E12)}$$

In equation E12, each $P_i$ denotes a path which can be followed from the independent variable node to the node whose value is being determined. In one embodiment a path is a series of directed lines allowed in sequence and in the same direction in such a way that no node is touched more than once. The value of the path is the product of all coefficients encountered in the process of traversing the path.

Furthermore, in equation E12, $\Sigma \mathcal{J}$ (1) denotes a sum over all first order loops. A first order loop is a series of directed lines coming to a closure when followed in sequence and in the same direction with no node passed more than once. The value of the loop is the product of all coefficients encountered in the process of traversing the loop.

In equation E12, $\Sigma \mathcal{J}$ (2) denotes the sum over all second order loops. A second order loop is the product of any two first order loops which do not touch at any point. Similarly, $\Sigma \mathcal{J}$ (n) denotes the sum over all n order loops. A n order loop is the product of any n first order loops which do not touch at any point.

In equation E12, $\Sigma \mathcal{J}$ $(1)^{(1)}$ denotes the sum of all the first order loops which do not touch $P_1$ at any point. Lastly, $\Sigma \mathcal{J}$ $(2)^{(1)}$ denotes the sum of all the second order loops which do not touch $P_1$ at any point.

The combining module 211 obtains $\alpha_i^{(j)}$ after the application of Mason's rules in equation E12 described above thereby completing the device model of a given transceiver 105 represented by equation E11. The device model for the given transceiver 105 represented by equation E11 describes the expected RF response of the transceiver 105 to an incoming signal from any direction in three-dimensional space. More specifically, the device model of a given transceiver 105 is a representation of the signal path through the non-radiating components of the non-radiating block 111A of the given transceiver 105, one or more ports of the non-radiating block 111A of the given transceiver 105, one or more ports of the radiating block 107A that are connected to the one or more ports of the non-radiating block 111A of the given transceiver 105, and a RF sensor(s) 109 (e.g., an antenna) of the radiating block 107A of the given transceiver 105.

As mentioned previously, the device model of a given transceiver 105 is a matrix or set of data entries where each data entry in the matrix is associated with a particular RF path in the transceiver using a particular RF sensor 109 for a given $\theta$ and $\varphi$. The matrix includes for each RF path of the transceiver entries for all possible combinations of $\theta$ and $\varphi$ in order to model all the possible RF responses for the RF path. The discretization of the angles $\theta$, $\varphi$ in n steps defines the minimum resolution of the estimation. In one embodiment, the angle in $\theta$ is discretized in 180 steps and $\varphi$ is discretized in 360 steps achieves 1-degree angular resolution in three-dimensional space. In one embodiment, interpolation techniques may further be used to increase the angular resolution. The matrix of data entries is saved as the device model 127 for storage in the device model storage 115 of the transceiver being modeled according to the first embodiment of FIG. 1A or is stored as a device model 133 in the device model storage 131 shared by all transceivers 105A to 105N in the second embodiment of FIG. 1B.

In one embodiment, the combining module 211 applies a curve fitting algorithm to the matrix of data entries. For example, a regression model is applied to the matrix of data entries. As a result, the combining module 211 generates a mathematical equation in terms of $\theta$ and $\varphi$ that is a best fit for the data in the matrix of data entries. Rather than store the matrix of data entries, the combining module 211 may store the mathematical equation that represents the matrix of data entries. By storing the mathematical equation, the amount of memory required by the device model storages 115A to 115N in the first embodiment of FIG. 1A and the device model storage 131 in the second embodiment of FIG. 1B is reduced at the expense of requiring more CPU performance to calculate the estimated response of the transceiver 105 using the mathematical equation.

As mentioned previously, the device model of a given transceiver 105 is used to interpret an incoming RF signal as a signal response vector that can be used to estimate location attributes of the transceiver that transmitted the RF signal. For example, an incoming wireless signal received from a top left side of the transceiver 105 relative to a center of the transceiver 105 presents a different RF response from the device model compared to another incoming signal received from a bottom right side of the transceiver relative to the center of the transceiver, for example.

The estimation module 203 of a receiving transceiver 105 (e.g., transceiver 105A) estimates location attributes of another transceiver 105 (e.g., transceiver 105B) that transmits a RF signal received by the given transceiver. In one embodiment, the estimated location attributes of the transmitting receiver describe a location of the transmitting transceiver. The estimated location attributes for the transmitting transceiver system 105B include the location of the transmitting transceiver system 105B 105 with respect to a global coordinate system and an estimated angle (e.g., azimuthal $\varphi$, and elevation $\theta$) of the transmitting transceiver in one embodiment.

The estimated location attributes may also include relative location attributes between the receiving transceiver system 105B 105A and the transmitting transceiver system 105B 105B. The estimated location attributes may include an estimated angle (e.g., azimuthal $\varphi$, and elevation $\theta$) between the receiving transceiver system 101A and the transmitting transceiver system 101B. The estimated location attributes may also include an estimated distance between the receiving transceiver system 101A and the transmitting transceiver system 10B and an estimated time of travel of the wireless signal between the receiving transceiver system 101A and transmitting transceiver system 101B. The estimated location attributes may include other location information as well as those described herein.

In one embodiment, the estimation module 203 estimates location attributes of a transmitting transceiver by correlating an incoming RF signal received by the receiving transceiver to the device model of the receiving transceiver. That is, the estimation module 203 compares the incoming RF signal to entries of the device model of the receiving transceiver to identify an entry that best matches (e.g., correlates) with the incoming RF signal. As mentioned above, each entry in the device model is associated with a particular polarization $\theta$, $\varphi$. The polarization $\theta$, $\varphi$ of the entry that best matches magnitude of the incoming RF signal corresponds to the angle of arrival of the incoming RF signal in terms of θ, φ. The angle of arrival can be used by the estimation module 203 to calculate other location attributes such as the position of the transmitter as described in the use case example below.

In one embodiment, the measurement module 205 performs one or more different types of measurements on incoming RF signals. The different types of measurements performed on a received RF signal include distance related measurements such as a received signal strength indication (RSSI) measurement, a time of flight (ToF) measurement, and or a round-trip-time (RTT) measurement. Other types of measurements may be performed in other examples such as angle of arrival (AoA) measurements and angle of departure (AoD) measurements. In one embodiment, the measurement module 205 may also be configured to calculate performance metrics such as a figure of merit (FoM).

The updating module 207 updates known locations of transceivers from transceiver system 101A and transceiver system 101B stored in the location storage 135 in the embodiment of FIG. 1A or the known locations of transceivers from transceiver system 101A and transceiver system 101B stored in the location storage 137 in the embodiment of FIG. 1B. By maintaining the most up to date location information of the transceivers, the accuracy of the predicated location of transceivers in the location tracking environments is improved.

Use Case Example

Figure 5A:
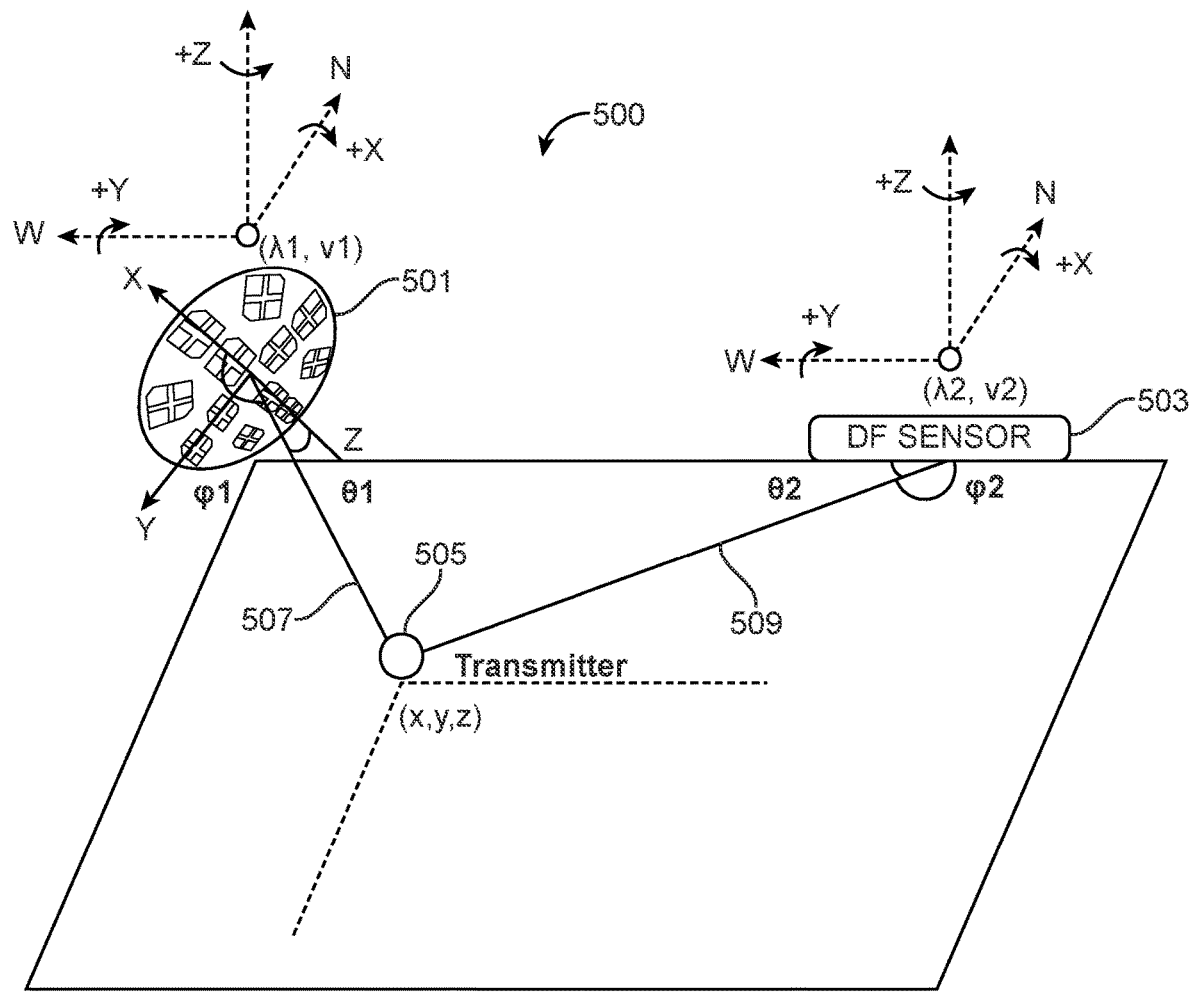
FIG. 5A illustrates a location tracking environment that uses a plurality of receiving transceivers to estimate location attributes of a transmitting transceiver operating according to an embodiment.

FIG. 5A illustrates a location tracking environment 500 that uses a plurality of receiving transceivers to estimate location attributes of a transmitting transceiver according to an embodiment. In the example, shown in FIG. 5A, two receiving transceivers 501 and 503 are used to estimate the location attributes of the transmitting transceiver 505. The two receiving transceivers 501 and 503 are positioned at known locations and the device model of each receiving transceiver 501 and 503 is also known. For example, the receiving transceivers 501 and 503 are placed on the ceiling of a building while the transmitting transceiver 505 is placed on a moving object just as a person or a machine.

In one embodiment, each receiving transceiver 501 and 503 receives an incoming RF signal from the transmitting transceiver 505. For example, receiving transceiver 501 receives incoming wireless signal 507 at polarizations θ1 and φ1 that are unknown. Similarly, receiving transceiver 503 receives incoming RF signal 509 at polarizations θ2 and φ2 that are unknown.

As mentioned above, the generic device model of each of the unique RF paths of the receiving transceivers 501 and 503 is represented by equation E11 previously described above, but reproduced below for explanation purposes.

$$\vec{a}^{(j)}(\theta, \varphi, f) = \sum_{i=1}^{N} \alpha_i^{(j)} \vec{a}_0^{(i)}(\theta, \varphi, f) \quad (E11)$$

Assuming each receiving transceiver 501 and 503 includes three RF sensors 109(1), 109(2), and 109(3), each receiving transceiver 501 and 503 provides three unique RF paths for the incoming RF signal. Note that each transceiver 501 and 503 may include any number of RF sensors 109 other than three which is used merely for explanation purposes. The response vectors for the three unique RF paths for a defined polarization θ can be described as follows with respect to equation E11.

$$\begin{pmatrix} \vec{a}_\theta^{(1)}(\theta, \varphi) \\ \vec{a}_\theta^{(2)}(\theta, \varphi) \\ \vec{a}_\theta^{(3)}(\theta, \varphi) \end{pmatrix}$$

Figure 5B:
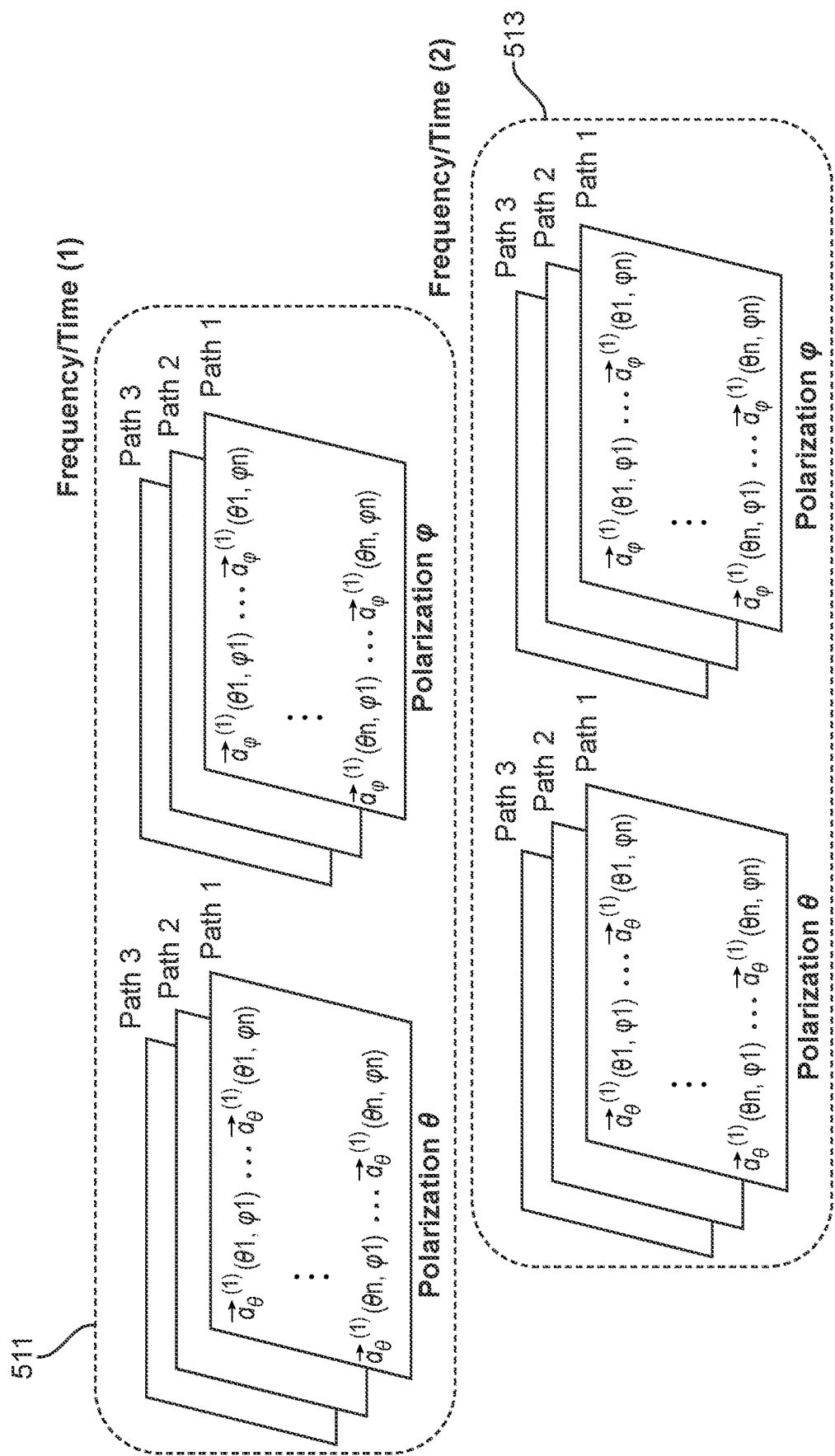
FIG. 5B illustrates a device model of a transceiver according to an embodiment.

The unique response of each RF sensor 109 included in the receiving transceivers 501 and 503 is a function of both the elevation angle θ and the azimuth angle φ and is stored in the device model of the receiving transceivers 501. At a given frequency and time, the three unique RF paths is shown in FIG. 5B. Device model 511 is a representation of the RF signal paths 1 to 3 of the RF sensors included in a given receiving transceiver 501 or 503 at frequency/time (1) at different angles θ,φ and device model 513 is a representation of the RF signal paths 1 to 3 of the RF sensors included in the given receiving transceiver 501 or 503 at frequency/time (2) at different angles θ,φ.

In one embodiment, the respective estimation module 203 of the receiving transceivers 501 and 503 estimates the direction of arrival of its incoming signal 507, 509 in terms of θ and φ. That is, estimation module 203 of receiving transceiver 501 estimates θ1 and φ1 according to the device model of the receiving transceiver 501 and the estimation module 203 of receiving transceiver 503 estimates θ2 and φ2 according to the device model of the receiving transceiver 503. In one embodiment, each of θ1 and θ2 can be considered an incident angle $\theta_{inc}$ and each of φ1 and φ2 can be considered an incident angle $\varphi_{inc}$. Under this assumption, at a given time t that the incoming RF signal arrives at its respective receiving transceiver 501 or 503, the incoming signal x(t) is represented by equation E13 shown below.

$$x(t) = ae^{bj}A(\theta_{inc}, \varphi_{inc}) \quad (E13)$$

where A is the actual vector response model of the unique RF paths.

In one embodiment, each estimation module 203 correlates the incoming RF signal to an entry in the device model to identify the entry in the device model that best matches the incoming wireless signal. The correlation $P_{corr}$ of the incoming signal to the stored generic device model for each of receiving transceivers 501 and 503 is represented by equation E14 shown below.

$$P_{corr}(\theta, \varphi) = A^H x(t) \quad (E14)$$

where $P_{corr}$ is a non-adaptive estimate of the spectrum of the incoming signal data and $A^H$ is the largest peak in the spectrum which is the estimated direction of arrival because $A^H(\theta, \varphi)A(\theta_{inc}, \varphi_{inc})$ has a maximum at $(\theta, \varphi) = \theta_{inc}, \varphi_{inc}$.

Knowing θ1 and φ1 of incoming wireless signal 507 and θ2 and φ2 of incoming wireless signal 509, the location of the transmitting transceiver 505 may be identified since two unique lines represented by the incoming wireless signals 507 and 509 intersect at a single point in space which corresponds to the location of the transmitting transceiver 505. In one embodiment, the estimation module 203 of each receiving transceiver 501, 503 works in conjunction with its respective coordinate conversion module 209 to convert the location of the receiving transceiver 501, 503 from its local coordinate system to the global coordinate system. Since the global coordinate system location of each receiving transceiver 501, 503 is known and the angles of the incoming wireless signals 507 and 509 are known, the location of the transmitting transceiver 505 in the global coordinate system is calculated.

Figure 5C:
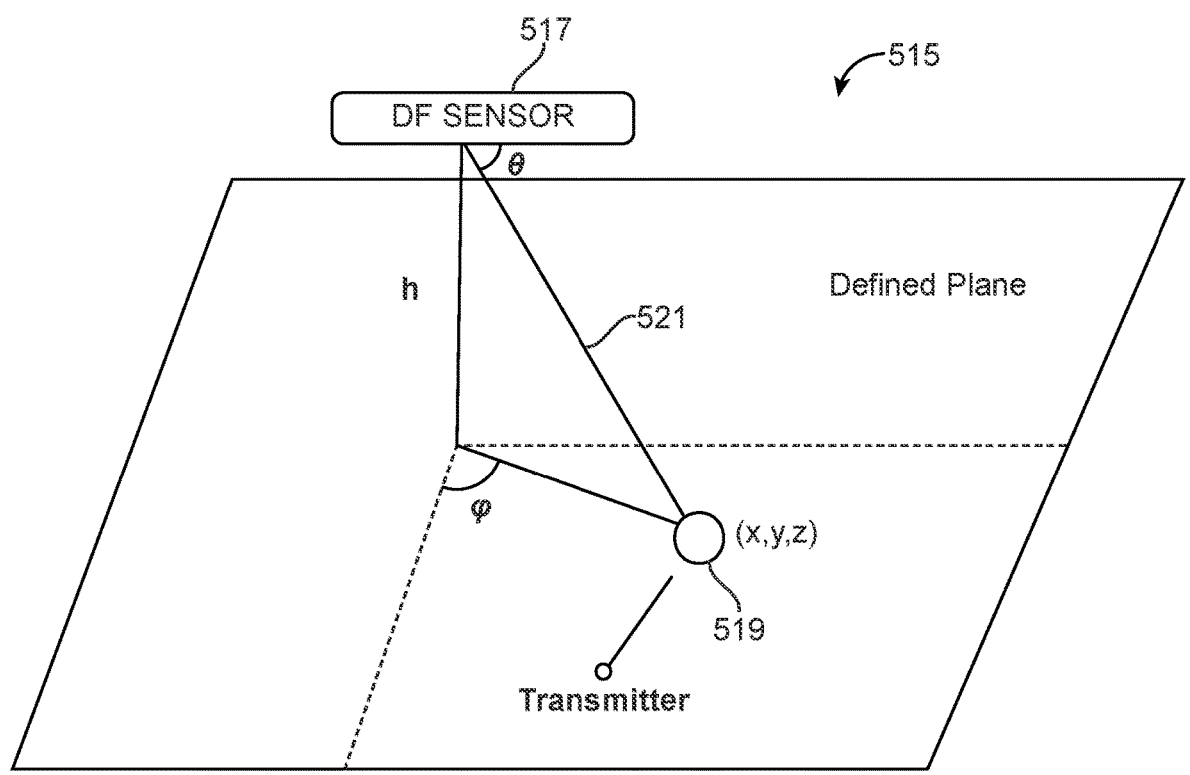
FIG. 5C illustrates a location tracking environment that uses one receiving transceiver to estimate location attributes of a transmitting transceiver according to an embodiment.

In the example environment shown in FIG. 5A, two receiving transceivers 501 and 503 are used to estimate the location attributes of the transmitting transceivers 505. In one embodiment, a location tracking environment 515 may include a single receiving transceiver 517 that receives an incoming wireless signal 521 having incoming angles θ,φ from transmitting transceiver 519 as shown in FIG. 5C. In order for the estimation module 203 of the single receiving transmitter 517 to determine the location attributes of the transmitting transceiver 519, the estimation module 203 assumes a value for height h of the transmitter 519 in one embodiment. Depending on the context of application, the transmitting transceiver 519 is always positioned within a particular height range such as roughly 6 feet high from ground assuming the transmitting transceiver 519 is placed on the head of a person. With the known value, the estimation module 203 of the receiving transceiver 517 may estimate the angles of the incoming wireless signal θ,φ by correlating the incoming wireless signal 521 with the stored device model of the receiving transceiver 517 as described above.

Method Flow Diagrams

Figure 6:
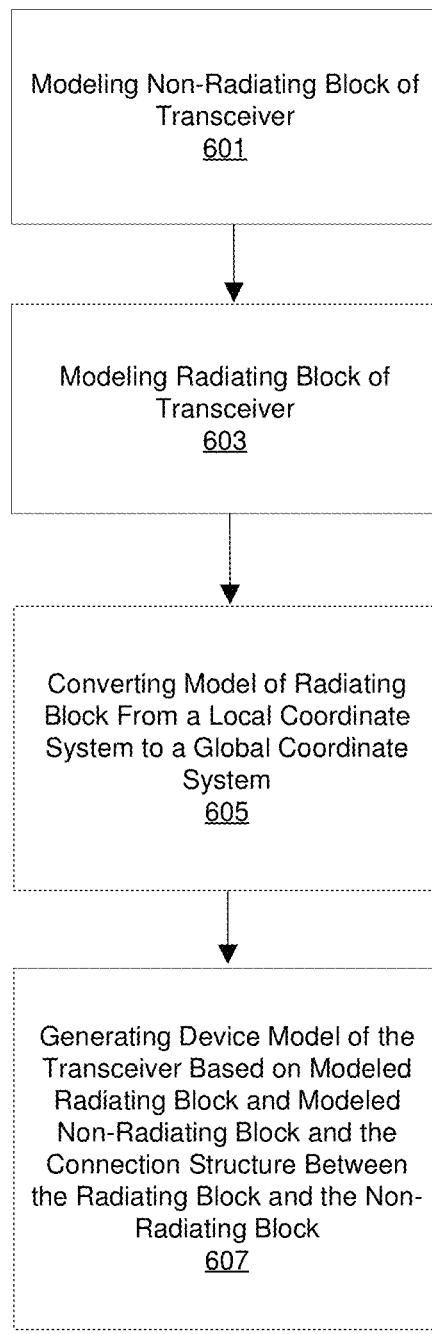
FIG. 6 illustrates a method flow diagram describing a process of generating a device model of a transceiver according to an embodiment.

FIG. 6 illustrates a method flow diagram describing a process of generating a device model of a transceiver according to an embodiment. Note in other embodiments, other steps may be performed than those illustrated in FIG. 6.

In one embodiment, a transceiver system 101 models 601 a non-radiating block of a transceiver 105 that is included in the transceiver system 101. The non-radiating block 111 of the transceiver 105 includes non-radiating components of the non-radiating block 111A such as RF switches, ports, transmission lines, and RF components such as a balun, attenuator, RF hybrid couplers, or resistor-inductor-capacitor (RLC) components. The non-radiating block 111 of the transceiver 105 may also include other non-radiating components such as Low Noise Amplifiers (LNA), Power Amplifiers (PA), multiplexers, phase shifters, tunable delay lines or any other active or passive RF components in the RF path that can be modeled by scattering parameters.

The transceiver system 101 models 603 the radiating block 107 of the transceiver 105. The radiating block 107 is configured to radiate or receive RF signals and includes one or more RF sensors 109. The RF sensors 109 may be arranged in an antenna array. In one embodiment, the model of the radiating block 107 includes a first portion based on scattering parameters of the radiating components of the radiating block 107. The model of the radiating block 107 also includes a second portion based on radiation patterns of the RF sensors 109 included in the radiating block 107.

In one embodiment, the second portion of the model of the radiating block is in the local coordinate system of the transceiver 105 being modeled. The transceiver system 101 converts 605 the second portion of the model of the radiating block that is in the local coordinate system to a global coordinate system. An example of the global coordinate system is the ECI reference frame.

The transceiver system 101 generates 607 the device model of the transceiver 105 based on the modeled radiating block and the modeled non-radiating block. In one embodiment, the model of the radiating block 107 and the model of the non-radiating block 111 are combined with consideration of the connection structure between the radiating block 108 and the non-radiating block 111, to form the general device model of the transceiver 105. Thus, the model of the transceiver 105 is generated based on a combination of combination of the model of the radiating block, the model of the non-radiating block, and RF transmission characteristics of a path of a RF signal between the radiating block and the non-radiating block of the transceiver 105 where the device model is representative of at least the path of the RF signal through non-radiating components of the radiating block, one or more first ports of the non-radiating block of the transceiver 105, one or more second ports of the radiating block the transceiver 105, and an RF sensor (e.g., an antenna) included in the radiating block. The general device model of the transceiver 105 is stored in the transceiver system 101. In one embodiment, the general device model of the transceiver 105 may be a data matrix that includes a plurality of data entries where each entry describes a RF response in terms of a magnitude of power and a phase of the power in response to a RF signal at specific polarizations θ and φ. Alternatively, the general device model is an equation that represents the data included in the data matrix.

Figure 7:
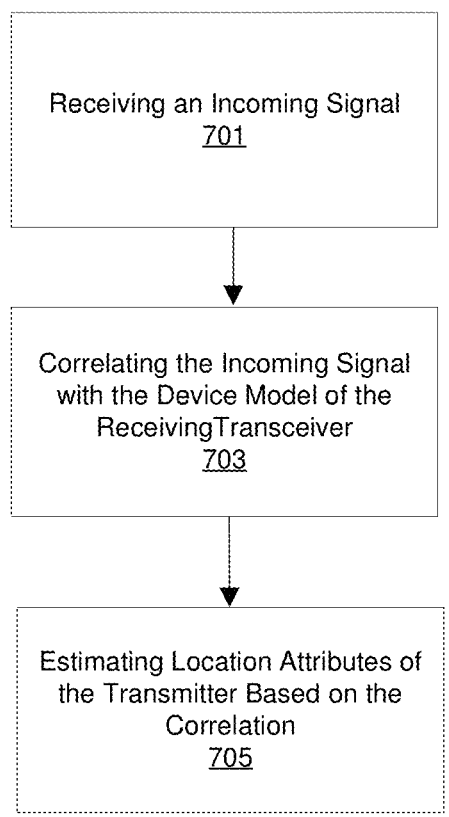
FIG. 7 illustrates a method flow diagram describing a process of estimating location attributes of a transceiver according to an embodiment.

FIG. 7 illustrates a method flow diagram describing a process of estimating location attributes of a transceiver according to an embodiment. Note in other embodiments, other steps may be shown than those illustrated in FIG. 7.

In one embodiment, a first transceiver (e.g., a receiver) of a transceiver system receives 707 an incoming RF signal from a second transceiver (e.g., a transmitter). The incoming RF signal is received at incoming angles θ and φ that are unknown. The angles of the incoming RF signal are examples of location attributes of the second transceiver.

To determine the incoming angles, the transceiver system correlates 703 the incoming RF signal with the device model of the first transceiver. In one embodiment, the incoming RF signal is correlated with the device model by comparing the incoming RF signal with the device model of the first transceiver.

The transceiver system 703 estimates 705 location attributes of the transmitter based on the correlation. That is, an entry in the device model that best matches the incoming signal is identified. As mentioned above, each entry in the device model describes a RF response in terms of a magnitude of power and a phase of the power in response to a RF signal at specific polarizations θ and φ. The pair of angles associated with the matching entry represent the incoming angles of the incoming signal. The location of the second transceiver may also be calculated based on the known location of the first transceiver and the angles θ and φ of the incoming RF signal. Note that in other embodiments other signal processing techniques/algorithms may be used to estimate the location attributes of the transmitter. For example, other algorithms that may be used to estimate the location attributes of the transmitter include spectral estimation, Capon Beamforming, phase interferometer techniques, multiple signal classification (MUSIC) algorithms, estimation of signal parameters via rational invariance techniques (ESPRIT) algorithms, space-alternating generalized expectation-maximization (SAGE) algorithm, PDA algorithms, Pseudo Doppler, and maximum likelihood estimators.

Autonomous Deployment of Transceivers

In one embodiment, transceivers may be classified as either "stationary" transceivers or "mobile" transceivers. Stationary transceivers are located at fixed positions for a period of time. For example, stationary transceivers may be placed on objects with fixed positions such as walls or ceilings of a building for a period of time (e.g., 1 year). However, stationary transceivers may be moved to a different fixed position such as to another wall or ceiling as needed and the locations of the stationary transceivers are redetermined after being moved to the different location. In contrast, mobile transceivers are not located at fixed positions. Mobile transceivers may be positioned on objects that move such as on a person or machinery. Thus, mobile transceivers are typically moved to different locations.

In one embodiment, stationary transceivers are "locators" configured to estimate locations of the mobile transceivers. In the description herein, the transceivers 105A to 105N included in transceiver system 101A in the location tracking environment 100A of FIG. 1A are considered stationary transceivers whereas the transceivers included in transceiver system 101B in the location tracking environment 100A are considered mobile transceivers. Similarly, the transceivers 105A to 105N included in transceiver system 101A in the location tracking environment 100B of FIG. 1B are considered stationary transceivers whereas the transceivers included in transceiver system 101B in the location tracking environment 100B are considered mobile transceivers.

In order for the stationary transceivers 101A to 105N of transceiver system 101A to estimate the locations of the mobile transceivers in transceiver system 101B, the stationary transceivers 101A to 105N first need to be deployed (i.e., initialized). In one embodiment, the stationary transceivers 101A to 105N are placed in an initialization mode to initialize the stationary transceivers 101A to 105N after placement of the stationary transceivers 101A to 105N since the locations of the stationary transceivers 101A to 101N are initially unknown. During deployment, the location of each stationary transceiver is automatically estimated by the remaining stationary transceivers. As will be further described below, each stationary transceiver 101A to 105N is configured to send and receive RF signals to one or more other stationary transceivers that are used to estimate the locations of the remaining stationary transceivers.

Figure 8:
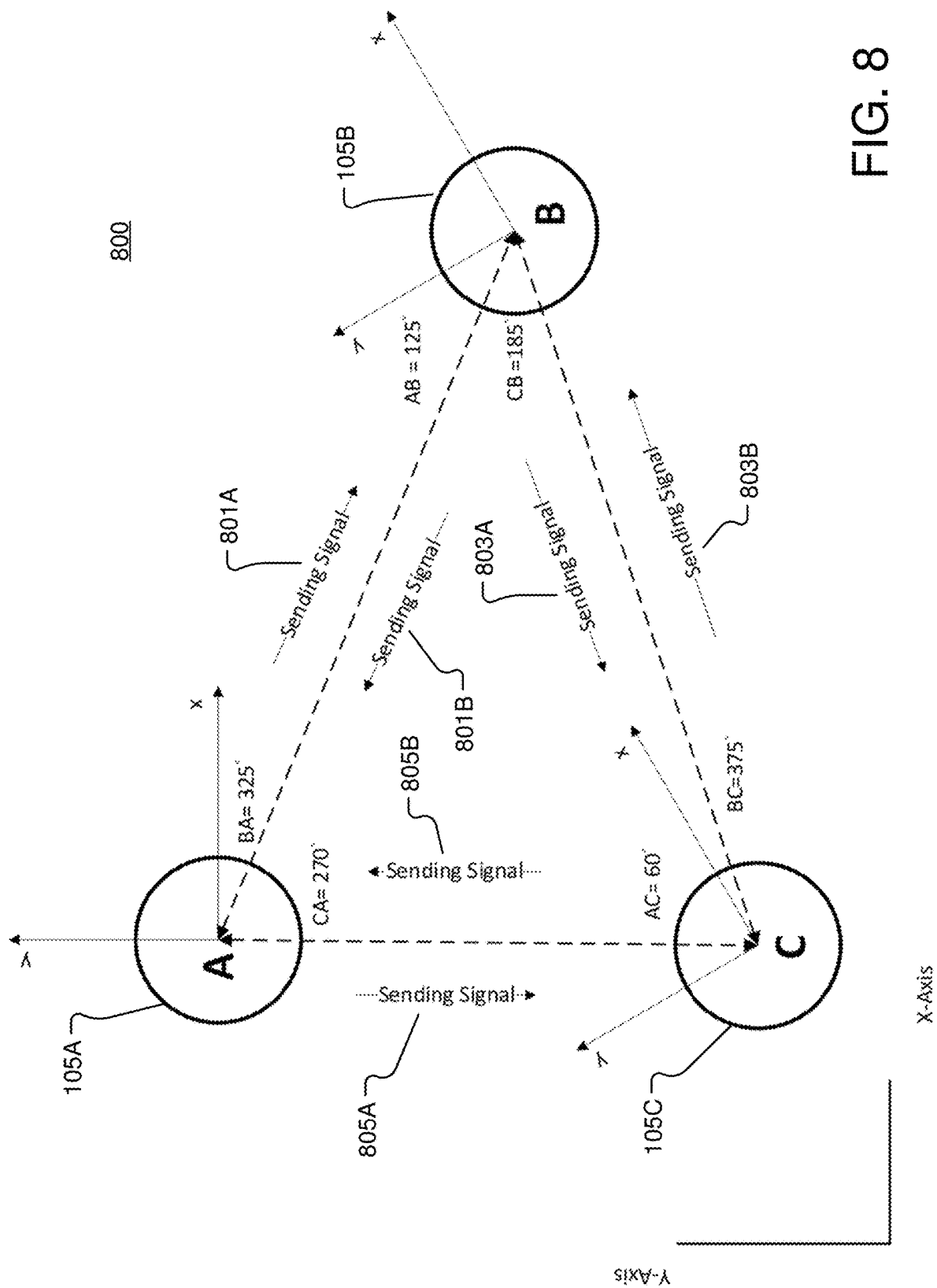
FIG. 8 illustrates a first group of stationary transceivers with unknown locations according to one embodiment.

FIG. 8 illustrates a group 800 of stationary transceivers with initially unknown locations according to one embodiment. The group 800 includes stationary transceiver 105A, stationary transceiver 105B, and stationary transceiver 105C where the location of each transceiver in the group 800 is unknown initially. While the group 800 includes only three stationary transceivers with unknown locations, the group 800 may include any number of stationary transceivers.

A group of stationary transceivers is created in response to the stationary transceivers being configured in an initialization mode. During the initialization mode, at least one of the stationary transceivers transmits an initiation signal to other stationary transceivers to initiate the deployment of the stationary transceivers 105A to 105C. By initiating the deployment of the stationary transceivers 105A to 105C, a location of each of the stationary transceivers 105A to 105C is estimated. In one embodiment, the stationary transceiver that initiates the deployment of the stationary transceivers is considered the reference transceiver. In the description herein, stationary transceiver 105A is the reference transceiver for the purpose of illustration. However, in other examples any of stationary transceivers 105A to 105C may be the reference transceiver.

In response to transmitting the initiation signal to other stationary transceivers, the reference transceiver 105A receives a response signal from each of the other stationary transceivers that received the initiation signal. The reference transceiver 105A determines the closest stationary transceivers in terms of distance based on the response signals received from other stationary transceivers.

In one embodiment, the reference transceiver 105A performs one or more measurements on the received response signals to determine the closest stationary transceivers. The one or more measurements performed by the reference transceiver 105A to determine the closest stationary transceivers include, for example, RSSI or ToF measurements. For example, the response signal having the greatest RSSI measurement or the shortest ToF measurement is the closest stationary transceiver to the reference transceiver 105A.

In one embodiment, the reference transceiver 105A generates a group of stationary transceivers including a predefined number of transceivers that are closest to the reference transceiver 105A. In the example herein, the predefined number of transceivers included in the group is three transceivers. However, any number of transceivers may be included in the group. As shown in FIG. 8, the closest stationary transceivers to the reference transceiver 105A are stationary transceivers 105B and 105C thereby forming the group 800 including reference transceiver 105A, stationary transceiver 105B, and stationary transceiver 105C.

Figure 9:
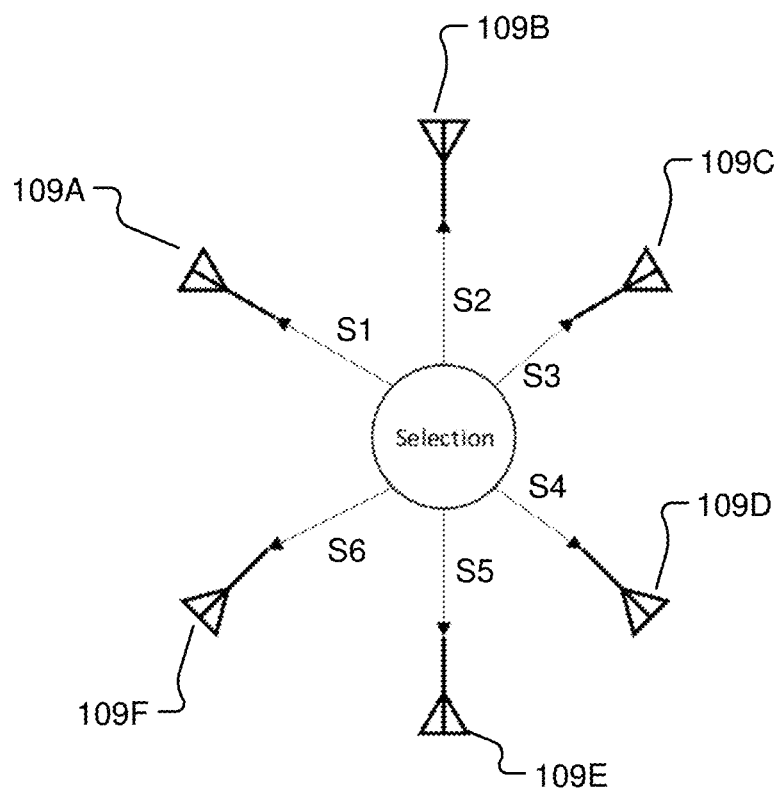
FIG. 9 illustrates a detailed view of a RF sensor array of a stationary transceiver according to one embodiment.

Referring to FIG. 9, a detailed view of a stationary transceiver 105 is shown. The detailed view of the stationary transceiver 105 is representative of each of the stationary transceivers 105A to 105N. In one embodiment, each stationary transceiver 105 includes a plurality of RF sensors 109. In this example, a stationary transceiver 105 includes RF sensors 109A to 109F arranged in an antenna array. Each RF sensor 109A to 109F represents a different signal path through the stationary transceiver 105.

In one embodiment, each RF sensor 109A to 109F is configured to output a corresponding RF signal at a plurality of different frequencies f. For example, RF sensor 109A outputs RF signal S1 at a plurality of different frequencies f, RF sensor 109B outputs RF signal S2 at a plurality of different frequencies f, RF sensor 109C outputs RF signal S3 at a plurality of different frequencies f, RF sensor 109D outputs RF signal S4 at a plurality of different frequencies f, RF sensor 109E outputs RF signal S5 at a plurality of different frequencies f, and RF sensor 109E outputs RF signal S6 at a plurality of different frequencies f.

Referring back to FIG. 8, in one embodiment, each stationary transceiver 105 in a group determines a subset of the RF signals received from other stationary transceivers 105 in the group to use to estimate the location attributes of the other stationary transceivers in the group. For example, reference transceiver 105A determines a subset of the RF signals S1 to S6 received from stationary transceiver 105B that will be used to estimate location attributes of stationary transceiver 105B. Only a subset of the RF signals is used by a stationary transceiver to estimate location attributes of another stationary transceiver in the group as the signal quality of the remaining RF signals may be insufficient to result in accurate location attributes.

To determine the subset of RF signals to use for location attribute estimation, each stationary transceiver 105 in the group receives a plurality of different sets of incoming RF signals at different frequencies f. In one embodiment, each set of incoming RF signals at a given frequency f is received from a different one of the remaining stationary transceivers 105 in the group at different times t. For example with reference to FIG. 8, reference transceiver 105A receives multiple sets of a plurality of signals S1 to S6 (e.g., signals 801B) at different frequencies at different times t from stationary transceiver 105B and receives multiple sets of a plurality of signals S1 to S6 (e.g., signals 805B) at different frequencies at different times t from stationary transceiver 105C. Similarly, stationary transceiver 105B receives multiple sets of a plurality of signals S1 to S6 (e.g., signals 801A) at different frequencies at different times t from reference transceiver 105A and receives multiple sets of a plurality of signals S1 to S6 (e.g., signals 803B) at different frequencies at different times t from stationary transceiver 105C. Lastly, reference transceiver 105C receives multiple sets of a plurality of signals S1 to S6 (e.g., signals 803A) at different frequencies at different times t from stationary transceiver 105B and receives multiple sets of a plurality of signals S1 to S6 (e.g., signals 805A) at different frequencies at different times t from reference transceiver 105A.

In one embodiment, each stationary transceiver 105 in the group may also receive auxiliary information from the other stationary transceivers in the group. The auxiliary information includes radio power information and radio timing (clock) information. In one embodiment, a stationary transceiver 105 uses the radio power information to calculate distance using RSSI. By knowing the transmitted power of the other stationary transceiver that transmitted the radio power information and the device models of both the stationary transceiver that received the radio power information and the stationary transceiver that transmitted the radio power information accurate estimations of distance are determined.

Furthermore, the radio timing information may be used for distance measurements. Particularly, a stationary transceiver may perform ToF or RTT distance measurements based on the time that the signal was generated at the stationary transceiver that transmitted the radio timing information and the time that the radio timing information is received at the other stationary transceiver. In one embodiment, the distance measurements are estimated using the constant speed of light. Since the RF signals propagate with the speed of light and the duration of the signal flight is known, the distance between two stationary transceivers may be estimated.

Each stationary transceiver 105 in the group correlates the incoming RF signals S1 to S6 included in the different sets of RF signals from each remaining stationary transceiver in the group to the device model of the stationary transceiver that received the incoming RF signals. To correlate the sets of incoming RF signals S1 to S6 received by each transceiver 105 in the group, each stationary transceiver 105 determines whether the incoming RF signals S1 to S6 at different frequencies f were transmitted at the same time t or at different times. Responsive to the RF incoming signals S1 to S6 at the different frequencies f being output at the same time t, the stationary transceiver 105 that received the signals compares the incoming RF signals S1 to S6 to its device model. In one embodiment, a field of view in terms of $\theta$ and $\varphi$ is defined such that the stationary transceiver 105 compares the RF incoming signals to entries in the device model for the defined values of $\theta$ and $\varphi$. As mentioned previously, by correlating the incoming RF signals S1 to S6 to the device model, each stationary transceiver 105 in the group estimates the relative angle of arrival of each incoming RF signal S1 to S6 in the $\theta$ and $\varphi$ directions as well as the magnitude of power of the incoming signal S1 to S6.

For example, the reference transceiver 105A estimates a magnitude of power of each incoming RF signal S1 to S6 and the relative angle of arrival of each incoming RF signal S1 to S6 from stationary transceiver 105B and estimates a magnitude of power of each incoming RF signal S1 to S6 and the relative angle of arrival of each incoming RF signal S1 to S6 from stationary transceiver 105C that best matches the device model. Stationary transceivers 105B and 105C perform similar estimations based on their respective received RF signals S1 to S6 from the other stationary transceivers in the group.

Responsive to a stationary transceiver 105 determining that the incoming RF signals S1 to S6 at the different frequencies f are associated with different times t, the stationary transceiver 105 that received the incoming RF signals S1 to S6 performs one or more calibrations on the incoming RF signals. For example, the stationary transceiver 105 may perform a RF path time/offset calibration on each incoming signal that results in a time/frequency calibration factor for the incoming signal. To perform the RF path time/offset calibration on an incoming signal, a stationary transceiver removes fast-varying components of the incoming signal by using a linear regression method. The phase of IQ samples are fitted into a line with equation $y=\beta_0+\beta_1 x+\varepsilon$. After the fast-varying component of the IQ samples of the incoming signal are removed, the signal may still include a temporal slow-varying component. To remove the temporal slow-varying component, a polynomial regression $y=\beta_0+\beta_1 x\pm\ldots\beta_n x^n+\varepsilon$ in conjunction with the device model of the stationary transceiver that received the incoming signal is used where n is 2 or 3 for example. In one embodiment, the stationary transceiver 105 adds to each incoming RF signal the time/frequency calibration factor for the incoming signal. The stationary transceiver 105 then correlates each calibrated incoming RF signal to the device model of the stationary transceiver 105 as described above.

In one embodiment, each stationary transceiver 105 in the group generates a correlation graph for the incoming RF signals S1 to S6 received from each remaining transceiver in the group. Thus, each stationary transceiver 105 generates a plurality of different correlation graphs where each correlation graph corresponds to another one of the stationary transceivers in the group. In one embodiment, each correlation graph indicates the peak magnitude of power resulting for each incoming signal S1 to S6 at each frequency f.

As mentioned previously, each stationary transceiver 105 in the group transmits the signals S1 to S6 at different instances in time t. In one embodiment, each stationary transceiver 105 in the group generates measurement variation histograms for each frequency of each incoming signal S1 to S6 based on the correlation graphs. Each stationary transceiver 105 determines from the measurement variation histograms the distributions of the peak magnitudes of power across the different frequencies for each signal S1 to S6.

In one embodiment, each stationary transceiver 105 determines the validity of the estimated information based on the distributions of the measurement variation histograms for each frequency of each incoming signal S1 to S6. Responsive to the distribution of a measurement variation histogram not following a normal distribution, each stationary transceiver 105 determines that the estimated information is invalid and rejects the estimated information associated with the incoming signals S1 to S6 that resulted in the measurement variation histogram and repeats the process described above. However, responsive to the distribution of a measurement variation histogram following a normal distribution, each stationary transceiver 105 determines that the estimated information is valid. Thus, each incoming signal at the particular frequency f is further evaluated for inclusion in the selected subset of the incoming signals that will be used to estimate location attributes of the stationary transceiver that transmitted the signals.

In one embodiment, each stationary transceiver 105A to 105C determines RSSI measurements of their respective incoming signals S1 to S6 for each frequency f that resulted in valid estimations. Each stationary transceiver 105A to 105C selects a subset of the incoming signals S1 to S6 that have a RSSI measurement above a threshold for further evaluation. In one embodiment, the value of the threshold is configurable. The value of the threshold may be based on the expected separation between stationary devices. For example, for stationary devices that are less than 15 meters apart, a RSSI threshold of −65 dB is used. In other embodiments, the threshold may be based on the device model of the stationary transceiver that receives the incoming signals and the gain the RF sensor(s) of the stationary transceiver at the direction of the incoming signal. If the gain of the RF sensor(s) at the direction of the incoming signal is less than the peak gain of the RF sensor(s), the threshold may be −70 dB for example.

Alternatively, each stationary transceiver 105 determines round trip time (RTT) measurements of their respective incoming signals S1 to S6 for each frequency f that resulted in valid estimations. Each stationary transceiver 105 selects a subset of the incoming signals S1 to S6 that have a RTT measurement below a threshold for further evaluation. Similar to the RSSI threshold, the threshold for the RTT measurement is configurable and may be a nanosecond or a fraction of a nanosecond.

In one embodiment, each stationary transceiver 105A to 105C may also measure at least one of a figure of merit (FoM) of all of the incoming signal S1 to S6 and determines whether the selected subset of incoming signals have the highest FoM measurements amongst all of the incoming signals S1 to S6. Responsive to the subset of incoming signals having the highest FoM measurements, the stationary transceiver 105 stores an indication to use the selected subset of incoming signals to estimate the location attributes of the other stationary transceiver 105 in the group that transmitted the subset of incoming signals. However, if the selected subset of incoming signals do not have the highest FoM measurements amongst all the incoming signals S1 to S6, the stationary transceiver 105 selects the subset of incoming signals that have the highest FoM measurements and RSSI measurements and stores an indication to use the selected subset to estimate the location attributes of the other stationary transceiver 105 in the group that transmitted the subset of incoming signals.

As a result of the selections, each stationary transceiver 105 in the group uses a plurality of different subsets of incoming RF signals to estimate the relative locations of the remaining stationary transceivers in the group. In one embodiment, each subset of incoming RF signals corresponds to one of the remaining stationary transceivers in the group. For example, reference transceiver 105A uses a first subset of incoming RF signals from stationary transceiver 105B to estimate the relative location of stationary transceiver 105B and uses a second subset of incoming RF signals from stationary transceiver 105C to estimate the relative location of stationary transceiver 105C. Similarly, reference transceiver 105B uses a first subset of incoming RF signals from reference transceiver 105A to estimate the relative location of reference transceiver 105A and uses a second subset of incoming RF signals from stationary transceiver 105C to estimate the relative location of stationary transceiver 105C. Furthermore, reference transceiver 105C uses a first subset of incoming RF signals from reference transceiver 105A to estimate the relative location of reference transceiver 105A and uses a second subset of incoming RF signals from stationary transceiver 105B to estimate the relative location of stationary transceiver 105B.

In one embodiment, each stationary transceiver 105A to 105C estimates the relative location of each remaining stationary transceiver using the selected subset of incoming RF signals for the remaining stationary transceiver. Each stationary transceiver 105 receives all of incoming RF signals S1 to S6 from each of the remaining stationary transceivers in the group, but only correlates the selected subset of incoming RF signals to the device model of the stationary transceiver 105 that received the incoming RF signals.

As mentioned previously, the selected subset of incoming signals may each be associated with a different frequency. As a result of the correlation, each stationary transceiver 105 determines location attributes of the stationary transceiver that transmitted the incoming signals for each frequency of the incoming RF signals. Thus, each stationary transceiver 105 determines a plurality of instances of location attributes for the stationary transceiver that transmitted the incoming RF signals since the incoming RF signals are transmitted at a plurality of different frequencies. Each instance of location attributes includes the angle of arrival of each incoming RF signal for the associated frequency in terms of θ and φ. Each instance of location attributes may also include a distance between the stationary transceiver that received the incoming RF signals and the stationary transceiver that transmitted the incoming signals.

In one embodiment, each stationary transceiver 105 in the group then calculates a weighted average of the different angles of arrival for each frequency. Each stationary transceiver 105 applies a weighting factor to the angles of arrival for each frequency where the weighting factor is based on a signal quality of the subset of incoming RF signals used to estimate the angles of arrival. In one embodiment, each stationary transceiver 105 calculates the weighting factor $W_f$ for the angles of arrival for each frequency according to equation E15 shown below.

$$W_f = \frac{\text{normalize}(RSSI_f)}{\sum \text{normalize}(RSSI\_f)) \cdot \text{normalize}(\text{mean}(FoM)) \cdot \text{normalize}(\text{min}(ToF))} \quad (E15)$$

where RSSI_f is the measured RSSI of the incoming signal at frequency f, Σ (RSSI_f) is a summation of the RSSI measurements for the different frequencies of the incoming RF signals, mean (FoM) is the average figure of merit measurement of the subset of the incoming RF signals, and min (ToF) is the minimum time of flight measurement of the subset of the incoming RF signals.

Each stationary transceiver 105 calculates the weighting factor $W_f$ for each frequency of angles of arrival according to equation 15 above and calculates the weighted average angle of arrival $WAoA_{avg}$ according to equation 16 shown below.

$$WAoA_{avg} = \frac{\sum W_f \cdot AoA_f}{\text{Num\_IncSignals}} \quad (E16)$$

where $\sum W_f AoA_f$ is the summation of the weighted angles of arrivals for each frequency of angle of arrival and Num_IncSignals is the total number of incoming signals included in the selected subset of incoming signals.

Given that each stationary transceiver 105 in the group now has the average angles of arrivals of the incoming RF signals received from each of the remaining stationary transceivers in the group, each stationary transceiver 105 in the group may estimate the relative location of each remaining transceiver in the group using the average angles of arrival of the incoming signals. As described previously, at least two unique lines represented by incoming RF signals intersect at a single point in space which corresponds to the location of the stationary transceiver that transmitted the incoming signals. Thus, each stationary transceiver 105 may estimate the relative location of the remaining transceivers in the groups since the average angles of arrivals of the incoming RF signals from the remaining transceivers in the groups are now known. In one embodiment, the location of each stationary transceiver in the group is relative to the reference transceiver. Thus, the location of stationary transceiver 105B in group 800 is relative to the location of stationary transceiver 105A and the location of stationary transceiver 105C is relative to the location of stationary transceiver 105A.

In one embodiment, the reference transceiver 105A may also perform angle-based measurements to identify the orientation of the remaining transceivers in the group and to convert the coordinate system of each remaining stationary transceiver in the group to the coordinate system of the reference transceiver. FIG. 10 illustrates an example of a first coordinate system of reference transceiver 105A and a second coordinate system of stationary transceiver 105B in one embodiment. A RF signal 1001 transmitted by stationary transceiver 105B to reference transceiver 105A is transmitted at an angle of 135 degrees with respect to the second coordinate system of the stationary transceiver 105B. However, the reference transceiver 105A receives the RF signal 1001 at an angle of 45 degrees with respect to the first coordinate system of the reference transceiver 105A.

In one embodiment, the reference transceiver 105A updates the coordinate system of stationary transceiver 105B to match the coordinate system of reference transceiver 105A. Having estimated the angle of arrival (e.g., $(\theta_{RX}, \varphi_{RX})$) with respect to the first coordinate system of the reference transceiver 105A by correlating the incoming RF signal 1001 from the stationary transceiver 105B to the reference transceiver's 105A device model, the reference transceiver 105A may estimate the relative orientation of the stationary transceiver 105B using equations E17 and E18 shown below.

$$\vec{A} = \begin{pmatrix} A_x \\ A_y \\ A_z \end{pmatrix} = \begin{pmatrix} \sin\theta_{TX}\cos\varphi_{TX} \\ \sin\theta_{TX}\sin\varphi_{TX} \\ \cos\theta_{TX} \end{pmatrix} \qquad (E17)$$

$$\begin{pmatrix} \sin\theta_{RX}\cos\varphi_{RX} \\ \sin\theta_{RX}\sin\varphi_{RX} \\ \cos\theta_{RX} \end{pmatrix} = \begin{pmatrix} -A_x \\ -A_y \\ -A_z \end{pmatrix} \qquad (E18)$$

The angles of orientation $\hat{A}$ of the stationary transceiver 105B with respect to the x-axis, y-axis, and z-axis are respectively $A_x$, $A_y$, and $A_z$. As shown in equation E17, $A_x$ is equal to $\sin\theta_{TX}\cos\varphi_{TX}$, $A_y$ is equal to $\sin\theta_{TX}\sin\varphi_{TX}$, and $A_z$ is equal to $\cos\theta_{TX}$. Here, the angles of transmission (e.g., $(\theta_{TX}, \varphi_{TX})$) of the RF signal 1001 from the stationary transceiver 105B are unknown.

However, as mentioned above, the angle of arrival (e.g., $(\theta_{RX}, \varphi_{RX})$) of the RF signal 1001 with respect to the first coordinate system of the reference transceiver 105A is known and can be used to solve the for the angles of transmission (e.g., $(\theta_{TX}, \varphi_{TX})$) of the RF signals from the stationary transceiver 105B. In one embodiment, the reference transceiver 105A solves for the angles of transmission from the stationary transceiver 105B using equation E18 shown above where $\sin\theta_{RX}\cos\varphi_{RX}$ is equal to the negative of the angle of transmission in the x-direction $A_x$, $\sin\theta_{RX}\sin\varphi_{RX}$ is equal to the negative of the angle of transmission in the y-direction $A_y$, and $\cos\theta_{RX}$ is equal to the negative of the angle of transmission in the z-direction $A_z$.

The reference transceiver 105A estimates the angle of transmission of incoming RF signals from all remaining stationary transceivers in the group as described above and stores the estimated angles of transmission. In one embodiment, the reference transceiver also transmits the estimated angle of arrival of incoming RF signals with respect to the reference transceiver's coordinate system to the stationary transceiver that transmitted the respective signals. The stationary transceiver may then update its coordinate system to match the coordinate system of the reference transceiver. For example, with respect to FIG. 10, stationary transceiver 105B may store an indication that the 135 degree angle of transmission of signal 1001 with respect to the second coordinate system of stationary transceiver 105B is equivalent to 45 degrees in the first coordinate system of the reference transceiver 105A.

After the relative locations of the stationary transceivers included in the initial group are automatically estimated by the stationary transceivers in the group, the relative locations of other stationary transceivers in the environment are automatically identified. FIG. 11A illustrates the initial group 800 (e.g., Group 1) that includes the reference transceiver 105A. The relative location of stationary transceivers 105B and 105C with respect to the reference transceiver 105A are determined and now known as described above.

In one embodiment, each remaining stationary transceiver in the initial group 800 then forms a new group of stationary transceivers with other stationary transceivers in the environment. For example, stationary transceiver 105B may generate a new group of stationary transceivers shown in FIG. 11B where stationary transceiver 105B is the reference transceiver in the newly formed group. In FIG. 11B, stationary transceiver 105B generated a new group 1101 including stationary transceiver 105B, stationary transceiver 105D, and stationary transceiver 105E in one embodiment.

Stationary transceivers 105D and 105E are identified as a result of the stationary transceiver 105B transmitting an initiation signal and receiving response signals back from other stationary transceivers. As previously described above, stationary transceiver 105B determines the closest stationary transceivers to include in the new group 1001 based on RSSI or ToF measurements of the received response signals. Each stationary transceiver in the new group 1101 determines a subset of signals received from other stationary transceivers in the group 1101 to use to estimate the location attributes of the other stationary transceivers in the group 1101 as described above with respect to group 800. Using the selected subset of signals, each stationary transceiver in the group 1101 estimates the relative location of the other stationary transceivers in the group 1101 with respect the reference transceiver 105B as described above with respect to group 800. The reference transceiver 105B of group 1101 may also update the coordinate system of the remaining stationary transceivers 105D and 105E in group 1101 based on the coordinate system of reference transceiver 105B.

Figure 11C:
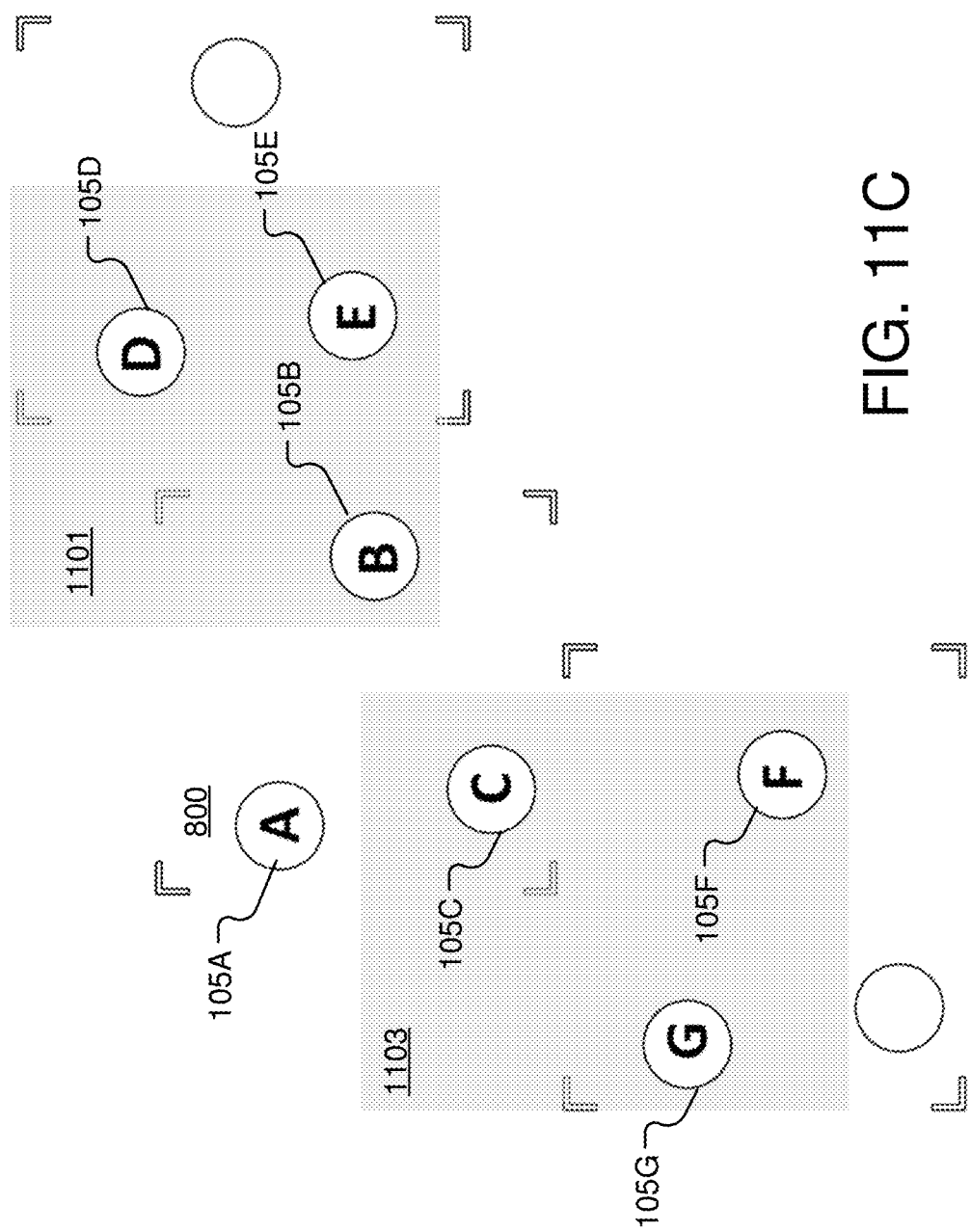

Stationary transceiver 105C from the initial group 800 may also generate a new group of stationary transceivers shown in FIG. 11C where stationary transceiver 105C is the reference transceiver in the newly formed group. In FIG. 11C, stationary transceiver 105C generated a new group 1103 including stationary transceiver 105C, stationary transceiver 105G, and stationary transceiver 105F in one embodiment.

Stationary transceivers 105G and 105F are identified as a result of the stationary transceiver 105C transmitting an initiation signal and receiving response signals back from other stationary transceivers. As previously described above, stationary transceiver 105C determines the closest stationary transceivers to include in the new group 1103 based on RSSI or ToF measurements of the received response signals. Each stationary transceiver in the new group 1103 determines a subset of signals received from other stationary transceivers in the group 1103 to use to estimate the location attributes of the other stationary transceivers in the group 1103 as described above with respect to group 800. Using the selected subset of signals, each stationary transceiver in the group 1103 estimates the relative location of the other stationary transceivers in the group 1003 with respect the reference transceiver 105C as described above with respect to group 800. The reference transceiver 105C of group 1103 may also update the coordinate system of the remaining stationary transceivers 105G and 105F in group 1103 based on the coordinate system of reference transceiver 105C.

Once the locations of the stationary transceivers in the environment are known, the stationary transceivers are now initialized and are switched to a deployment mode to estimate locations of mobile transceivers in the environment. FIG. 12 illustrates a system environment 1200 including stationary transceivers 105A and 105B previously described above and mobile transceivers 1201 and 1203 according to one embodiment. While only two stationary transceivers 105A and 105B are shown, the environment 1200 may include additional stationary transceivers as described with respect to FIG. 11A to 11C.

Generally, now that the locations of the stationary transceivers locations are known in a local coordinate system relative to each other, a location of mobile transceivers that exchange signal information with the stationary transceivers may be estimated. In real world implementations, the radio frequency channel environment among transceivers can change over time and can also be affected by variations in geometry of the space (e.g., moving objects, new objects in the area), the number of transceivers that are using those channels, and the relative location between transceivers. Thus, in one embodiment each stationary transceiver estimates location attributes of the mobile transceivers over a plurality of different frequencies f at different times t to account for the different changes.

In environment 1200, the location and orientation of the stationary transceivers 105A and 105B are known. Each of stationary transceiver 105A and 105B receive incoming RF signals from mobile transceivers 1101 and 1103 that are used to estimate location attributes of the mobile transceivers 1101 and 1103. In one embodiment, the incoming RF signals have different frequencies and are received at different times.

For example, stationary transceiver 105A may receive at time t1 RF signals having frequencies f1, f2, and f3 from mobile transceiver 1201. Based on the received signals at time t1 from mobile transceiver 1201, the stationary transceiver 105A may estimate the angle of the mobile transceiver 1201 is 45 degrees using the RF signal having frequency f1, is 47 degrees using the RF signal having frequency f2, and is 45 degrees using the RF signal having the frequency f3. In one embodiment, the stationary transceiver 105A may calculate a weighted average of the calculated angles of the mobile transceiver 1101 at time t1 using equations 15 and 16 previously described above to estimate the true location of mobile device 1101 is at 45 degrees at time t1 with respect to the coordinate system of the stationary transceiver 105A.

Stationary transceiver 105A may then receive at time t2 the RF signals having frequencies f1, f2, and f3 from mobile transceiver 1201. Based on the received RF signals at time t2 from mobile transceiver 1201, the stationary transceiver 105A may again estimate the angle of the mobile transceiver 1201 is 45 degrees using the RF signal having frequency f1, is 47 degrees using the RF signal having frequency f2, and at 45 degrees using the RF signal having the frequency f3. The stationary transceiver 105A may calculate a weighted average of the calculated angles of the mobile transceiver 1101 at time t2 using equations 15 and 16 previously described above to estimate that the true location of mobile device is at 45 degrees at time t2 with respect to the coordinate system of the stationary transceiver 105A.

Similarly, stationary transceiver 105B may receive at time t1 RF signals having frequencies f1, f2, and f3 from mobile transceiver 1201. Based on the received RF signals at time t1 from mobile transceiver 1101, the stationary transceiver 105B may estimate the angle of the mobile transceiver 1101 is 65 degrees using the RF signal having frequency f1, is 95 degrees using the RF signal having frequency f2, and is 67 degrees using the RF signal having the frequency f3. In one embodiment, the stationary transceiver 105B may calculate a weighted average of the calculated angles of the mobile transceiver 1201 at time t1 using equations 15 and 16 previously described above to estimate that the true location of mobile device 1101 is 66 degrees at time t1 with respect to the coordinate system of the stationary transceiver 105A.

Stationary transceiver 105B may then receive at time t2 the RF signals having frequencies f1, f2, and f3 from mobile transceiver 1201. Based on the received signals at time t2 from mobile transceiver 1201, the stationary transceiver 105B may again estimate the angle of the mobile transceiver 1201 is 63 degrees using the signal having frequency f1, is 95 degrees using the signal having frequency f2, and is 72 degrees using the RF signal having the frequency f3. The stationary transceiver 105A may calculate a weighted average of the calculated angles of the mobile transceiver 1101 at time t2 using equations 15 and 16 previously described above to estimate that the true location of mobile device is 66 degrees at time t2 with respect to the coordinate system of the stationary transceiver 105A.

A similar process is performed by each of stationary transceiver 105A and stationary transceiver 105B for the incoming RF signals having frequencies f1, f2, and f3 at times t1 and t2 from mobile device 1203. The stationary transceiver 105A estimates the true location of mobile device 1103 at time t1 is 17 degrees with respect to the coordinate system of the stationary transceiver 105A and estimates the true location of mobile device 1103 at time t2 is 17 degrees with respect to the coordinate system of the stationary transceiver 105A as show in FIG. 12. Similarly, the stationary transceiver 105B estimates the true location of mobile device 1203 at time t1 is 66 degrees with respect to the coordinate system of the stationary transceiver 105B and estimates the true location of mobile device 1103 at time t2 is 118 degrees with respect to the coordinate system of the stationary transceiver 105B as shown in FIG. 12.

Each stationary transceiver may store the estimated location attributes of the mobile transceivers over the different frequencies and the different times to generate the location storage 135/137. Responsive to the stationary transceivers estimating new location attributes for the mobile transceivers at later times, the stationary transceivers may compare the stored location attributes with the newly estimated location attributes to determine if the newly estimated location attributes are valid or invalid. For example, any newly estimated location attributes that are within a standard deviation of the historical location attributes stored in the location storage 135/137 are considered valid whereas newly estimated location attributes that are outside of the standard deviation of the historical location attributes are considered invalid and thereby discarded. Thus, the embodiments described herein improve location tracking performance over time as the frequency channels that should be used for different locations and which stationary transceivers are more accurate for tracking locations of different mobile transceivers based on the location of the mobile transceivers is determined.

Method Flow Diagrams for Automated Deployment

Figure 13:
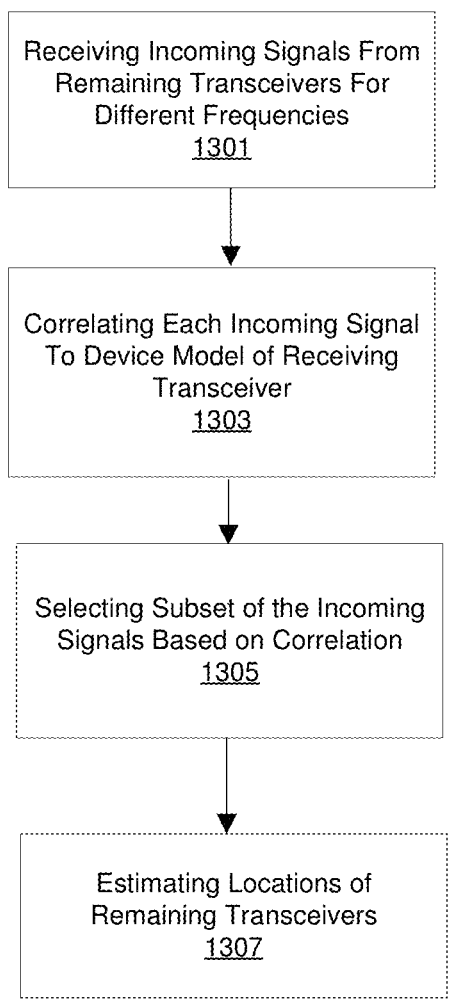
FIG. 13 illustrates a method flow diagram describing a process of autonomous deployment of stationary transceivers according to an embodiment.

FIG. 13 illustrates one embodiment of a method of automated deployment of stationary transceivers according to one embodiment. Note in other embodiments, other steps may performed than those illustrated in FIG. 13.

In one embodiment, a group of a plurality of stationary transceivers is formed where a location of each stationary transceiver in the group is unknown. Each stationary transceiver in the group receives 1301 incoming RF signals from remaining transceivers in the group where the RF signals have different frequencies. Each stationary transceiver in the group correlates 1303 each incoming RF signal a device model of the stationary transceiver that received the RF signals. The device model comprises a combination of a first model of a first portion of the transceiver that includes non-radiating components of the transceiver that do not radiate a RF signal of the transceiver, a second model of a second portion of the transceiver that includes an antenna configured to radiate a RF signal, and RF transmission characteristics of a path of the RF signal between the first portion and the second portion of the transceiver. In one embodiment, the device models representative of at least the path of the RF signal through the non-radiating components, one or more first ports of the first portion of the first transceiver system, one or more second ports of the second portion of the first transceiver system, and the antenna. By correlating the incoming RF signals, each stationary transceiver in the group estimates location attributes of the remaining transceivers in the group.

Each stationary transceiver in the group then selects 1205 a subset of the incoming RF signals to use to estimate the location of the remaining transceivers based on the correlation as the different incoming RF signals result in estimated locations with varying accuracy. Each stationary transceiver may select the subset of incoming RF signals based on a distribution of the estimated location attributes of the stationary transceivers in the group and a signal quality of each of the incoming RF signals. For example, incoming RF signals that follow a normal distribution are further evaluated in terms of their RSSI measurement and FoM measurement to determine whether to use the incoming RF signals to estimate the location of the other transceivers in the group. Each stationary transceiver in the group then estimates 1307 a location of the remaining transceivers in the group using the selected subset of the incoming RF signals.

Figure 14A:
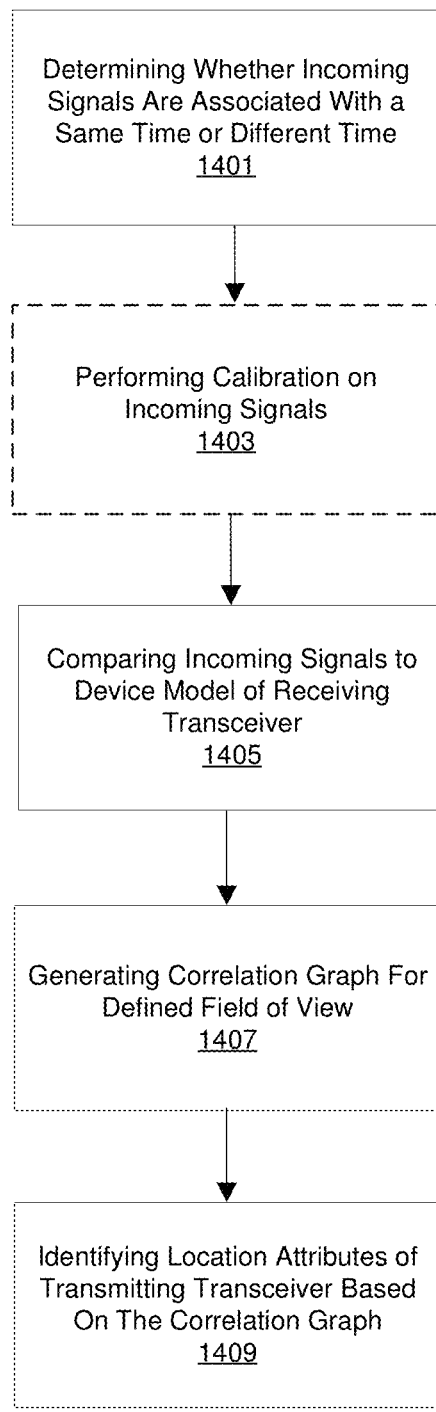
FIG. 14A illustrates a method flow diagram describing a process of correlating each incoming signal to a device model of a receiving transceiver according to one embodiment.

FIG. 14A illustrates one embodiment of steps performed in the correlation 1303 of each incoming RF signal to the device model of the receiving transceiver according to one embodiment. Note in other embodiments, other steps may performed than those illustrated in FIG. 14A.

In one embodiment, each stationary transceiver that received the incoming RF signals determines 1401 whether the incoming RF signals are associated with a same time t or different times. Responsive to the incoming RF signals being associated with a different time t, the stationary transceiver may optionally perform 1403 calibration on the incoming RF signals that are associated with different times. In one embodiment, the calibration includes performing a RF path time/frequency offset calibration on each incoming RF signal to generate a time/frequency calibration factor that is added to the incoming RF signal. Responsive to the incoming RF signals being associated with the same time t, the stationary transceiver compares 1405 the incoming RF signals to the device model of the stationary transceiver that received the incoming RF signals. In one embodiment, the stationary transceiver performs the comparison with respect to a predetermined field of view in terms of θ and φ and generates 1407 a correlation graph for the predefined field of view. The stationary transceiver then identifies 1409 the location attributes of the transceiver that transmitted the RF signals based on the correlation graph. That is, the stationary transceiver identifies an entry in the device model that best matches the incoming RF signal and the polarization angles of the matching entry are determined as at least part of the location attributes of the stationary transceiver that that transmitted the RF signal.

Figure 14B:
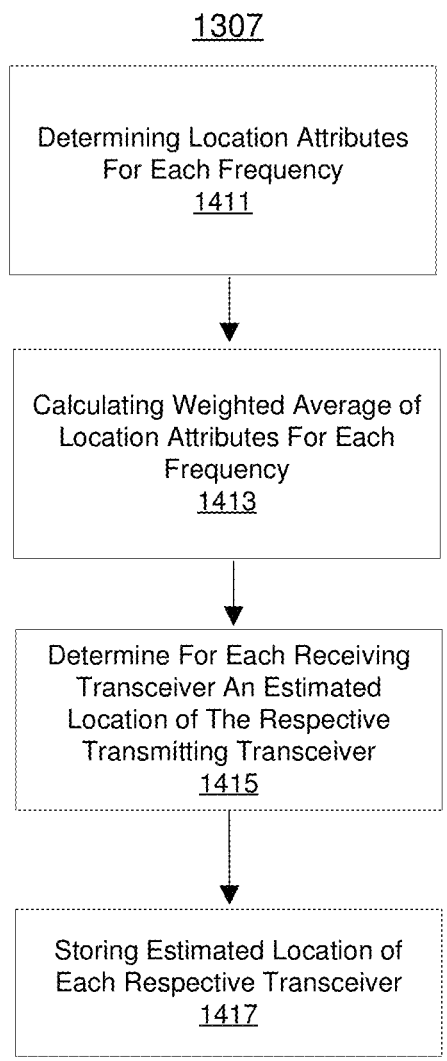
FIG. 14B illustrates a method flow diagram describing a process of estimating location attributes of stationary transceivers according to one embodiment.

FIG. 14B illustrates one embodiment of steps performed in estimating 1307 the locations of remaining transceivers in the group according to one embodiment. Note in other embodiments, other steps may performed than those illustrated in FIG. 14B.

In one embodiment, each transceiver in the group determines 1411 location attributes of each remaining transceiver in the group for each frequency of incoming RF signal received from the remaining transceiver. Thus, each transceiver generates multiple sets of location attributes of a remaining transceiver in the group where each set of location attribute corresponds to a particular frequency of RF signal transmitted by the remaining transceiver. Each stationary transceiver calculates 1413 a weighted average of the location attributes for each frequency. In one embodiment, the weighted average of location attributes are the weighted average of the angle of arrivals of the incoming RF signals. Using the weighted average of the angle of arrivals of RF signals transmitted by one of the remaining stationary transceivers in the group, the stationary transceiver may determine 1415 an estimated location of the remaining transceiver. The estimated location of each respective transceiver is stored 1417 in the location storage 135/137.

Figure 15:
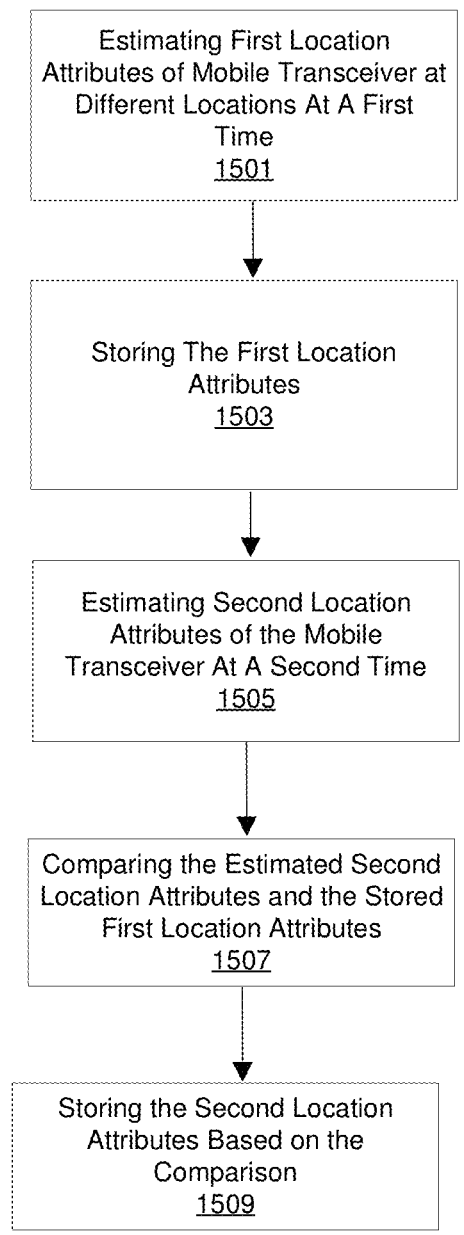
FIG. 15 illustrates a method flow diagram describing a process of generating a database of locations of mobile transceivers according to one embodiment.

FIG. 15 illustrates one embodiment a method for estimating location attributes of mobile transceivers according to one embodiment. Note in other embodiments, other steps may performed than those illustrated in FIG. 15.

Once the location of the stationary transceivers is automatically identified, the initialization of the stationary transceivers is complete, and the stationary transceivers are configured in a deployment mode. The stationary transceivers may now be used to estimate location attributes of mobile transceivers. In one embodiment, a stationary transceiver may estimate 1501 first location attributes of a mobile transceiver at a first time. The stationary transceiver may estimate the first location attributes by correlating a subset of incoming RF signals received from the mobile transceiver at the first time with the device model of the stationary transceiver. The stationary transceiver may store 1503 the first location attributes.

At a second time, the stationary transceiver may receive incoming RF signals from the mobile transceiver. The stationary transceiver may estimate 1501 second location attributes of the mobile transceiver at the second time. The stationary transceiver may estimate the second location attributes of the mobile transceiver by correlating the subset of incoming RF signals received from the mobile transceiver at the second time with the device mode of the stationary transceiver. The stationary transceiver compares the second location attributes with the stored location attributes of the mobile transceiver to determine the validity of the second location attributes. The stationary transceiver may store 1509 the second location attributes based on the comparison. That is, the second location attributes are stored if the comparison indicates the validity of the second location attributes. Otherwise, the second location attributes are discarded if determined to be invalid.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of autonomous deployment of a transceiver system, the method comprising:
    receiving, by each of a plurality of transceivers included in a group of transceivers, a plurality of incoming radio frequency (RF) signals from each remaining transceiver in the group, at least some of the plurality of incoming RF signals received by each transceiver having different frequencies;
    estimating, by each of the plurality of transceivers, location attributes of each remaining transceiver in the group according to a correlation between the plurality of incoming RF signals received from each remaining transceiver in the group and a device model of the transceiver that received the plurality of incoming RF signals, wherein the device model comprises a combination of a first model of a first portion of the transceiver that includes non-radiating components of the transceiver that do not radiate a RF signal of the transceiver, a second model of a second portion of the transceiver that includes an antenna configured to radiate a RF signal, and RF transmission characteristics of a path of the RF signal between the first portion and the second portion of the transceiver, the device model representative of at least the path of the RF signal through the non-radiating components, one or more first ports of the first portion of the first transceiver system, one or more second ports of the second portion of the first transceiver system, and the antenna;
    selecting, by each of the plurality of transceivers in the group, a subset of the plurality of incoming RF signals based on the estimated location attributes of each remaining transceiver in the group;
    estimating, by each of the plurality of transceivers in the group, a location of each remaining transceiver in the group using the selected subset of the plurality of incoming RF signals from the remaining transceiver; and
    storing, by each of the plurality of transceivers in the group, the estimated location of each remaining transceiver.

2. The method of claim 1, wherein locations of the plurality of transceivers in the group are initially unknown.

3. The method of claim 1, wherein selecting the subset of the plurality of incoming RF signals comprises:
    comparing, by each of the plurality of transceivers in the group, each incoming RF signal from the plurality of incoming RF signals to the device model of the transceiver that received the incoming RF signal; and
    estimating, by each of the plurality of transceivers in the group, a plurality of sets of location attributes based on the comparisons, each set of location attributes associated with a corresponding incoming RF signal at a given frequency.

4. The method of claim 3, further comprising:
generating, by each of the plurality of transceivers in the group, a plurality of correlation graphs, each correlation graph associated with a corresponding incoming RF signal and indicative of peak location attributes included in the set of location attributes for the corresponding incoming RF signal at a plurality of different frequencies;
generating, by each of the plurality of transceivers in the group, a plurality of histograms, each histogram associated with a corresponding incoming RF signal and indicative of variations in the peak location attributes for the incoming RF signal at the plurality of different frequencies;
determining, by each of the plurality of transceivers, a subset of the plurality of histograms having variations in the peak location attributes that follow a normal distribution; and
selecting, by each of the plurality of transceivers, a subset of the incoming RF signals received by the transceiver, the selected subset of the incoming RF signals corresponding to the subset of the plurality of histograms having the variations in the peak location attributes that follow the normal distribution.

5. The method of claim 4, further comprising:
ranking, by each of the plurality of transceivers, the plurality of incoming RF signals based on a signal quality measurement,
wherein the selected subset of the incoming RF signals have a highest ranking based on the signal quality measurement.

6. The method of claim 5, wherein the signal quality measurement is a received signal strength indicator (RSSI) measurement, a figure of merit (FoM) measurement, round trip time (RTT) measurement, or a combination of the RSSI measurement, the FoM measurement, or RTT measurement.

7. The method of claim 3, wherein comparing each incoming RF signal to the device model comprises:
determining whether the plurality of incoming RF signals are associated with a same time or different times;
wherein the plurality of incoming RF signals are compared to a predefined portion of the device model responsive to the plurality of incoming RF signals being associated with the same time.

8. The method of claim 7, further comprising:
calibrating the plurality of incoming RF signals responsive to determining that the plurality of incoming RF signals are associated with different times;
wherein the calibrated plurality of incoming RF signals are compared to the predefined portion of the device model.

9. The method of claim 1, wherein estimating the location attributes comprises:
calculating, by each of the plurality of transceivers, an average of the location attributes of each remaining transceiver for each frequency of incoming RF signal from the plurality of incoming RF signals.

10. The method of claim 9, wherein calculating the average of the location attributes comprises:
generating a weighting factor for each frequency of incoming RF signal based on a received signal strength indicator (RSSI) measurement of the incoming RF signal, a figure of merit of the incoming RF signal, and a time of flight of the incoming RF signal; and
applying the weighting factor to a corresponding average of the location attributes of each remaining transceiver for each frequency of incoming RF signal.

11. The method of claim 9, wherein estimating the location of each remaining transceiver in the group comprises:
estimating, by each of the plurality of transceivers, a location of each remaining transceiver in the group using the average of the location attributes of the incoming RF signals received from each respective remaining transceiver in the group.

12. The method of claim 1, wherein the location of each remaining transceiver in the group is with respect to a location of a reference transceiver in the group.

13. The method of claim 12, further comprising:
determining, by the reference transceiver in the group, an orientation of each remaining transceiver in the group with respect to a coordinate system of the reference transceiver; and
transmitting, by the reference transceiver, to each remaining transceiver in the group the orientation of the remaining transceiver with respect to the coordinate system of the reference transceiver to update a coordinate system of the remaining transceiver to match the coordinate system of the reference transceiver.

14. The method of claim 1, further comprising:
receiving, by at least one transceiver of the plurality of transceivers in the group, a plurality of first incoming RF signals from a mobile transceiver at a first time, the plurality of first incoming RF signals from the mobile transceiver each having a different frequency;
estimating, by the at least one transceiver, a plurality of first estimated locations of the mobile transceiver based on the plurality of first incoming RF signals, each of the plurality of first estimated locations associated with a different frequency and measured with respect to the estimated location of the at least one transceiver;
calculating, by the at least one transceiver, a first location of the mobile device at the first time based on the plurality of first estimated locations of the mobile transceiver;
saving the first location of the mobile device;
receiving, by the at least one transceiver, a plurality of second incoming RF signals from the mobile transceiver at a second time, the plurality of second incoming RF signals each having the different frequency;
estimating, by the at least one transceiver, a plurality of second estimated locations of the mobile transceiver, each of the plurality of second estimated locations associated with a different frequency and measured with respect to the estimated location of the at least one transceiver;
calculating, by the at least one transceiver, a second location of the mobile device at the second time based on the plurality of second estimated locations of the mobile transceiver;
determining a validity of the second location of the mobile device at the second time based on a comparison of the second location and the stored first location; and
storing the second location of the mobile device at the second time responsive to the second location being valid.

15. A method of autonomous deployment of a transceiver system, the method comprising:
receiving, by each of a plurality of transceivers included in a group of transceivers, a plurality of incoming radio frequency (RF) signals from each remaining transceiver in the group, at least some of the plurality of incoming RF signals received by each transceiver having different frequencies;

estimating, by each of the plurality of transceivers, location attributes of each remaining transceiver in the group according to a correlation between the plurality of incoming RF signals received from each remaining transceiver in the group and a device model of the transceiver that received the plurality of incoming RF signals, the device model representative of at least one path of a RF signal through the transceiver;

selecting, by each of the plurality of transceivers in the group, a subset of the plurality of incoming RF signals based on a distribution of the estimated location attributes of the plurality of transceivers in the group and a signal quality of each of the plurality of incoming RF signals;

estimating, by each of the plurality of transceivers in the group, a location of each remaining transceiver in the group using the selected subset of the plurality of incoming RF signals for the transceiver; and storing, by each of the plurality of transceivers in the group, the estimated location of each remaining transceiver.

16. The method of claim 15, wherein estimating the location attributes comprises:

calculating, by each of the plurality of transceivers, an average of the location attributes of each remaining transceiver for each frequency of incoming RF signal from the plurality of incoming RF signals.

17. The method of claim 16, wherein calculating the average of the location attributes comprises:

generating a weighting factor for each frequency of incoming RF signal based on a received signal strength indicator (RSSI) measurement of the incoming RF signal, a figure of merit of the incoming RF signal, and a time of flight of the incoming RF signal; and applying the weighting factor to a corresponding average of the location attributes of each remaining transceiver for each frequency of incoming RF signal.

18. The method of claim 16, wherein estimating the location of each remaining transceiver in the group comprises:

estimating, by each of the plurality of transceivers, a location of each remaining transceiver in the group using the average of the location attributes of the incoming RF signals received from each respective remaining transceiver in the group.

19. The method of claim 15, further comprising:

receiving, by at least one transceiver of the plurality of transceivers in the group, a plurality of first incoming RF signals from a mobile transceiver at a first time, the plurality of first incoming RF signals from the mobile transceiver each having a different frequency;

estimating, by the at least one transceiver, a plurality of first estimated locations of the mobile transceiver based on the plurality of first incoming RF signals, each of the plurality of first estimated locations associated with a different frequency and measured with respect to the estimated location of the at least one transceiver;

calculating, by the at least one transceiver, a first location of the mobile device at the first time based on the plurality of first estimated locations of the mobile transceiver;

saving the first location of the mobile device;

receiving, by the at least one transceiver, a plurality of second incoming RF signals from the mobile transceiver at a second time, the plurality of second incoming RF signals each having the different frequency;

estimating, by the at least one transceiver, a plurality of second estimated locations of the mobile transceiver, each of the plurality of second estimated locations associated with a different frequency and measured with respect to the estimated location of the at least one transceiver;

calculating, by the at least one transceiver, a second location of the mobile device at the second time based on the plurality of second estimated locations of the mobile transceiver;

determining a validity of the second location of the mobile device at the second time based on a comparison of the second location and the stored first location; and storing the second location of the mobile device at the second time responsive to the second location being valid.

20. A system of transceivers comprising:

a group of transceivers including a plurality of transceivers, each of the plurality of transceivers initially having an unknown location and configured to:

receive, by each of the plurality of transceivers, a plurality of incoming radio frequency (RF) signals from each remaining transceiver in the group, at least some of the plurality of incoming RF signals received by each transceiver having different frequencies;

estimate, by each of the plurality of transceivers, location attributes of each remaining transceiver in the group according to a correlation between the plurality of incoming RF signals received from each remaining transceiver in the group and a device model of the transceiver that received the plurality of incoming RF signals, wherein the device model comprises a combination of a first model of a first portion of the transceiver that includes non-radiating components of the transceiver that do not radiate a RF signal of the transceiver, a second model of a second portion of the transceiver that includes an antenna configured to radiate a RF signal, and RF transmission characteristics of a path of the RF signal between the first portion and the second portion of the transceiver, the device model representative of at least the path of the RF signal through the non-radiating components, one or more first ports of the first portion of the first transceiver system, one or more second ports of the second portion of the first transceiver system, and the antenna;

select, by each of the plurality of transceivers in the group, a subset of the plurality of incoming RF signals based on the estimated location attributes of each remaining transceiver in the group;

estimate, by each of the plurality of transceivers in the group, a location of each remaining transceiver in the group using the selected subset of the plurality of incoming RF signals for the transceiver; and store, by each of the plurality of transceivers in the group, the estimated location of each remaining transceiver.

21. A system of transceivers comprising:

a group of transceivers including a plurality of transceivers, each of the plurality of transceivers initially having an unknown location and configured to:

receive, by each of the plurality of transceivers, a plurality of incoming radio frequency (RF) signals from each remaining transceiver in the group, at least some of the plurality of incoming RF signals received by each transceiver having different frequencies;

estimate, by each of the plurality of transceivers, location attributes of each remaining transceiver in the group according to a correlation between the plurality of incoming RF signals received from each remaining transceiver in the group and a device model of the transceiver that received the plurality of incoming RF signals, the device model representative of at least one path of a RF signal through the transceiver;

select, by each of the plurality of transceivers in the group, a subset of the plurality of incoming RF signals based on a distribution of the estimated location attributes of the plurality of transceivers in the group and a signal quality of each of the plurality of incoming RF signals;

estimating, by each of the plurality of transceivers in the group, a location of each remaining transceiver in the group using the selected subset of the plurality of incoming RF signals for the transceiver; and storing, by each of the plurality of transceivers in the group, the estimated location of each remaining transceiver.

* * * * *